US011980590B2

(12) United States Patent
Omura

(10) Patent No.: US 11,980,590 B2
(45) Date of Patent: May 14, 2024

(54) TABLET CASSETTE

(71) Applicant: TOSHO, INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 123 days.

(21) Appl. No.: 17/354,511

(22) Filed: Jun. 22, 2021

(65) Prior Publication Data

US 2021/0308015 A1 Oct. 7, 2021

Related U.S. Application Data

(63) Continuation-in-part of application No. PCT/JP2019/050703, filed on Dec. 24, 2019.

(30) Foreign Application Priority Data

Dec. 25, 2018 (JP) ................................ 2018-241162

(51) Int. Cl.
*A61J 7/00* (2006.01)
*B65D 83/04* (2006.01)

(52) U.S. Cl.
CPC ........ *A61J 7/0076* (2013.01); *B65D 83/0409* (2013.01)

(58) Field of Classification Search
CPC ........ A61J 3/00; A61J 7/0076; B65D 83/0409
USPC ........................... 21/187, 204; 221/187, 204
See application file for complete search history.

(56) References Cited

U.S. PATENT DOCUMENTS 3,741,703 A * 6/1973 Reynolds .................. B29B 9/00 425/222
4,588,366 A * 5/1986 Glatt .......................... B01J 2/16 264/117
4,946,359 A * 8/1990 Christen .................... B01J 2/10 425/222
5,026,709 A * 6/1991 Harwood ................ A61J 3/005 514/263.34

(Continued)

FOREIGN PATENT DOCUMENTS

CN 103298442 A * 9/2013 ............ A61J 7/0076
EP 1285850 A2 * 2/2003 ............. B65B 35/08

(Continued)

*Primary Examiner* — Rakesh Kumar
(74) *Attorney, Agent, or Firm* — Rankin, Hill & Clark LLP

(57) ABSTRACT

A tablet cassette that facilitates adjustment of the widths of tablet containing spaces includes a tablet container for containing tablets in a random manner, and a rotor provided in the tablet container and having a plurality of tablet receiving portions. Tablets having fallen down into the tablet receiving portions because of rotation of the rotor are allowed to consecutively fall down through a discharge port in a bottom wall portion of the tablet container. The rotor includes a circumferential expansion-contraction mechanism and a radial expansion-contraction mechanism externally mounted on an inserted portion of a rotary shaft that penetrates the bottom wall portion of the tablet container. The circumferential expansion-contraction mechanism can expand and contract the plurality of tablet receiving portions in the circumferential direction in conjunction with each other. The radial expansion-contraction mechanism can individually expand and contract the tablet receiving portions in the radial direction.

9 Claims, 10 Drawing Sheets

(56) References Cited

U.S. PATENT DOCUMENTS

| | | | | | |
|---|---|---|---|---|---|
| 5,074,824 | A * | 12/1991 | Suris | G07D 9/008 | 453/57 |
| 5,803,309 | A * | 9/1998 | Yuyama | G07F 11/44 | 221/27 |
| 6,786,356 | B2 * | 9/2004 | Geiger | A47J 31/60 | 99/290 |
| 7,669,733 | B2 * | 3/2010 | Kim | G07F 11/54 | 221/265 |
| 8,430,269 | B2 * | 4/2013 | Nam | B65B 35/08 | 221/265 |
| 9,238,545 | B2 * | 1/2016 | Bae | G07F 11/44 | |
| 11,382,834 | B2 * | 7/2022 | Risch | A61J 7/0076 | |
| 2006/0249525 | A1 | 11/2006 | Handfield et al. | | |
| 2011/0163112 | A1 * | 7/2011 | Takahama | G07F 17/0092 | 221/277 |
| 2013/0284755 | A1 * | 10/2013 | Yuyama | G07F 11/44 | 221/277 |
| 2015/0027286 | A1 * | 1/2015 | Yuyama | A61J 7/02 | 83/105 |
| 2015/0083746 | A1 | 3/2015 | Yuyama et al. | | |
| 2016/0371916 | A1 * | 12/2016 | Omura | G07F 17/0092 | |
| 2021/0308015 | A1 * | 10/2021 | Omura | A61J 7/0076 | |

FOREIGN PATENT DOCUMENTS

| | | | | |
|---|---|---|---|---|
| EP | 2804156 | A1 * | 11/2014 | B65D 83/04 |
| EP | 3235737 | A1 * | 10/2017 | A61J 3/07 |
| EP | 4104809 | A1 * | 12/2022 | A61J 7/0076 |
| WO | WO-2016099094 | A1 * | 6/2016 | A61J 3/07 |
| WO | WO-2017164196 | A1 * | 9/2017 | A61J 3/00 |
| WO | WO-2020170664 | A1 * | 8/2020 | A61J 1/03 |

* cited by examiner

TABLET CASSETTE

TECHNICAL FIELD

The present invention relates to a tablet cassette that forms a driven portion in a tablet feeder configured to automate dispensing of medicine performed in hospitals, pharmacies, etc. Particularly, the present invention relates to a tablet cassette including a tablet container for containing tablets and a rotor provided in the tablet container, the tablet cassette allowing the tablets to consecutively fall down through a discharge port of the tablet container while aligning the tablets around the rotor when the rotor is driven by a rotary shaft.

BACKGROUND ART

FIG. 9 of U.S. Patent Application Publication No. 2006/0249525 (Patent Document 1) illustrates a structure in which door members 810 operable to slide in the circumferential direction with respect to opening portions of medicine containing spaces 904C provided in a rotor are provided, and the positions of the door members 810 are adjusted to change the opening widths of the medicine containing spaces 904C, in order to support differences in the geometry of tablets.

Meanwhile, FIGS. 22A and 22B of U.S. Patent Application Publication No. 2015/0083746 (U.S. patent Ser. No. 10/137,057; WO 2012/096328) (Patent Document 2) disclose a tablet cassette in which a rotor including a plurality of tablet guide grooves (tablet containing spaces) includes a groove width adjustment mechanism operable to relatively move both side surfaces of the plurality of tablet guide grooves in the circumferential direction of the rotor. The groove width adjustment mechanism includes: a first movable plate in which a plurality of first adjustment walls having first side walls that form first side surfaces of the plurality of tablet guide grooves are provided at the outer periphery; a second movable plate which is provided to be rotatable with respect to the first movable plate and in which a plurality of second adjustment walls having second side walls that form second side surfaces of the plurality of tablet guide grooves to face the first side surfaces of the first movable plate are provided at the outer periphery; and a movable plate movement mechanism operable to relatively rotate the first movable plate and the second movable plate. The movable plate movement mechanism includes: a first adjustment hole and a second adjustment hole provided in the first movable plate; a third adjustment hole and a fourth adjustment hole provided in the second movable plate and intersecting the first adjustment hole and the second adjustment hole, respectively; and an operation member including a first adjustment pin to be fitted with the first adjustment hole and the third adjustment hole and a second adjustment pin to be fitted with the second adjustment hole and the fourth adjustment hole. The tablet cassette disclosed in Patent Document 2 also includes a movable piece drive mechanism operable to move a plurality of movable pieces that form inner surfaces in the plurality of tablet guide grooves, the inner surfaces facing in the radial direction of the rotor.

RELATED-ART DOCUMENT

Patent Document

[Patent Document 1] FIG. 9 of U.S Patent Application No. 2006/0249525

[Patent Document 2] U.S Patent Application No. 2015/0083746 (WO 2012/096328)

SUMMARY OF INVENTION

Technical Problem

In the tablet cassette described in Patent Document 1, in which the opening widths of the opening portions of the medicine containing spaces are changed by changing the positions of the door members, it is necessary to individually slide the door members.

In the tablet cassette described in Patent Document 2, meanwhile, the movable plate movement mechanism which is operable to relatively rotate the first movable plate and the second movable plate is used to relatively move both side surfaces of the plurality of tablet guide grooves in the circumferential direction of the rotor in conjunction with each other. In the movable plate movement mechanism, the widths of the plurality of tablet guide grooves are changed in conjunction with each other by moving the first and second movable plates in the circumferential direction, by fitting the first adjustment pin with the first adjustment hole provided in the first movable plate and the third adjustment hole provided in the second movable plate, fitting the second adjustment pin with the second adjustment hole provided in the first movable plate and the fourth adjustment hole provided in the second movable plate, and adjusting the positions of the first and second adjustment pins with respect to the first to fourth adjustment holes. With this configuration, however, it is necessary to change and adjust the widths of the tablet guide grooves (tablet containing spaces) by disassembling a rotor until the first adjustment pin and the second adjustment pin are seeable, determining the positions of the first adjustment pin and the second adjustment pin, thereafter checking the widths of the tablet guide grooves, and changing the positions of the first adjustment pin and the second adjustment pin again if the widths of the tablet guide grooves are inappropriate. Therefore, the work of adjusting the widths of the tablet guide grooves (tablet containing spaces) is not simple. With this structure according to the related art, in addition, the widths can be adjusted stepwise, but cannot be adjusted continuously.

An object of the present invention is to provide a tablet cassette that facilitates adjustment of the widths of tablet containing spaces compared to the related art.

Solution to Problem

The present invention provides a tablet cassette including: a tablet container having a tablet containing space therein for containing a plurality of tablets in a random manner, the tablet container including a bottom wall portion formed with a discharge port to allow the plurality of tablets in the tablet containing space to fall down one by one; a rotary shaft having an axial line extending in a direction orthogonal to the bottom wall portion of the tablet container; and a rotor operable to rotate about the axial line in the tablet containing space of the tablet container along with rotation of the rotary shaft, the rotor including a plurality of tablet receiving portions configured to receive the tablets one by one and allow the tablets to pass therethrough to the discharge port. The plurality of tablet receiving portions each include a radially opening portion that opens in a radial direction of the rotary shaft, a pair of axially opening portions that open on both sides in an axial direction in which the axial line extends, a facing wall portion that faces the radially opening portion, and a pair of side wall portions which are a first side wall portion and a second wall portion that face each other in a circumferential direction of the rotary shaft. In the tablet cassette according to the present invention, the rotor includes a circumferential expansion-contraction mechanism externally mounted on the rotary shaft to expand and contract the plurality of tablet receiving portions in the circumferential direction in conjunction with each other. The circumferential expansion-contraction mechanism includes: a first turning member including the first side wall portions of the pairs of side wall portions disposed at predetermined intervals in the circumferential direction, and operable to relatively turn about the axial line within a predetermined angular range; a second turning member including the second side wall portions of the pairs of side wall portions disposed at predetermined intervals in the circumferential direction, and operable to relatively turn about the axial line within the predetermined angular range; and a link mechanism configured to couple the first turning member and the second turning member in an interlocking manner. The link mechanism is configured such that when one of the first turning member and the second turning member is turned toward one side in the circumferential direction by a predetermined angle through a manual operation, the other of the first turning member and the second turning member is turned toward the other side in the circumferential direction by an angle equal to the predetermined angle.

With the present invention, the widths of the plurality of tablet receiving portions can be changed to a desired dimension by manually moving the first turning member or the second turning member while seeing the distance between the pair of side wall portions of the tablet receiving portions from the radially outer side of the rotor.

Specifically, the first turning member includes a first turning plate having a first through hole through which the rotary shaft passes and a plurality of the first side wall portions provided at an outer peripheral portion of the first turning plate, and a pair of first and second pins provided on a surface of the first turning plate facing the second turning member at positions 180 degrees away from each other about the axial line of the first turning plate, the first and second pins extending toward the second turning member. The second turning member includes a second turning plate having a second through hole through which the rotary shaft passes and a plurality of the second side wall portions provided at an outer peripheral portion of the second turning plate, and a pair of third and fourth pins provided on a surface of the second turning plate facing the first turning member at positions 180 degrees away from each other about the axial line of the second turning plate, the third and fourth pins extending toward the first turning member. The link mechanism includes: abase plate disposed between the first turning plate and the second turning plate and having a third through hole through which the rotary shaft passes, and a pair of first and second elongated through holes provided at positions 180 degrees away from each other about the axial line to extend in the radial direction. On an assumption that a first imaginary line passes through the pair of the first and second elongated through holes; a second imaginary line extends orthogonally to the first imaginary line and extends orthogonally to the axial line; and a third imaginary line and a fourth imaginary line extend orthogonally to the second imaginary line respectively on both sides of the radial direction of the third through hole, the base plate has a pair of third and fourth elongated through holes located line-symmetrically with respect to the second imaginary line and extending along the third imaginary line, and a pair of fifth and sixth elongated through holes located line-symmetrically with respect to the second imaginary line and extending along the fourth imaginary line. The link mechanism also includes: a first link located between the first turning plate and the base plate and having a first fitting hole and a second fitting hole, the first fitting hole being provided at one end of the first link to be turnably fitted with the second pin, and the second fitting hole being provided at the other end of the first link to be turnably fitted with a sixth pin penetrating the first elongated through hole provided in the base plate; and a second link located between the first turning plate and the base plate and having a third fitting hole and a fourth fitting hole, the third fitting hole being provided at one end of the second link to be turnably fitted with the first pin, and the fourth fitting hole being provided at the other end of the second link to be turnably fitted with a fifth pin penetrating the second elongated through hole provided in the base plate. The link mechanism further includes: a third link located between the second turning plate and the base plate and having a fifth fitting hole and the fifth pin, the fifth fitting hole being provided at one end of the third link to be turnably fitted with the third pin, and the fifth pin being provided at the other end of the third link to penetrate the second elongated through hole provided in the base plate; and a fourth link located between the second turning plate and the base plate and having a sixth fitting hole and the sixth pin, the sixth fitting hole being provided at one end of the fourth link to be turnably fitted with the fourth pin, and the sixth pin being provided at the other end of the fourth link to penetrate the first elongated through hole provided in the base plate. The first pin is fitted with the sixth elongated through hole. The second pin is fitted with the third elongated through hole. The third pin is fitted with the fourth elongated through hole. The fourth pin is fitted with the fifth elongated through hole. Respective lengths of the first to fourth links, respective lengths and positions of the first to sixth pins, respective positions of the first to sixth fitting holes, and respective positions and lengths of the first to sixth elongated through holes are determined such that, when one of the first turning member and the second turning member is turned by a predetermined angle toward one side in the circumferential direction through a manual operation, the other of the first turning member and the second turning member is turned by an angle equal to the predetermined angle toward the other side in the circumferential direction.

When such a configuration is adopted, it is possible to provide a link mechanism operable continuously using a small number of types of components.

The rotary shaft includes a fixing-unfixing mechanism mounted on the rotor to fix and unfix a mutual positional relationship of the first and second turning members and the link mechanism. When such a fixing-unfixing mechanism is provided, the widths of the plurality of tablet receiving portions can be continuously changed by operating the link mechanism without removing the rotor from the rotary shaft.

Preferably, a cap member shaped to stir the tablets in the tablet containing space is removably mounted on the rotor. In this case, if the cap member is provided with a plurality of overhanging portions extending in the radial direction except for areas above the plurality of tablet receiving portions, the tablets are allowed to reliably fall down into the tablet containing space.

The plurality of first side wall portions and the plurality of second side wall portions may each include one or more slits formed at the same height in a direction in which the axial line extends, the slits opening in the circumferential direction and the radial direction of the axial line. The tablet container may be provided with a partition functioning member configured to laterally partition the tablet receiving portion above the discharge port, the partition functioning member passing through the one or more slits of the plurality of first side wall portions and the plurality of second side wall portions provided at the same height when the rotor is rotated. When such slits and a partition functioning member are provided, it is possible to reliably prevent two tablets from falling down at the same time.

Preferably, the partition functioning member is adjustable in position according to the one or more slits. With such a configuration, the partition functioning member can be disposed at an appropriate position that matches the size of the tablets.

The tablet cassette may further include an elastic endless belt tensely provided above the partition functioning member and positioned higher than the overhanging portions. When such an elastic endless belt is disposed, tablets which are placed on an overhanging portion of the cap member and are not likely to fall down into the tablet receiving portions are lightly flipped, or pressed while changing the portion of abutment, by the endless belt above the overhanging portion, to change the positions or the postures of the tablets. Therefore, the tablets are quickly moved onto a nearby tablet receiving portion. Thus, undesirable residence of tablets can be easily and adequately avoided even if the overhanging portions of the cap member are large.

The plurality of facing wall portions of the plurality of tablet receiving portions may be fixed. The plurality of facing wall portions of the plurality of tablet receiving portions may each be adjustable in position in the radial direction of the rotary shaft. The plurality of facing wall portions of the plurality of tablet receiving portions may each be adjustable in position in the radial direction of the rotary shaft in conjunction with each other. When the facing wall portions are adjustable in position, the tablet receiving portions can be immediately adjusted in shape through a simple operation for tablets of different shapes. Thus, the tablet cassette can be easily used commonly for various types of medicine.

Preferably, each of corner portions of the facing wall portions located facing the tablet containing space is rounded. With this configuration, the tablets enter the tablet receiving portions with no difficulty even if the facing wall portions are located on the radially outer side through position adjustment of the facing wall portions.

DESCRIPTION OF EMBODIMENTS

A tablet cassette according to embodiments of the present invention will be described with reference to the drawings.

Figure 1A:
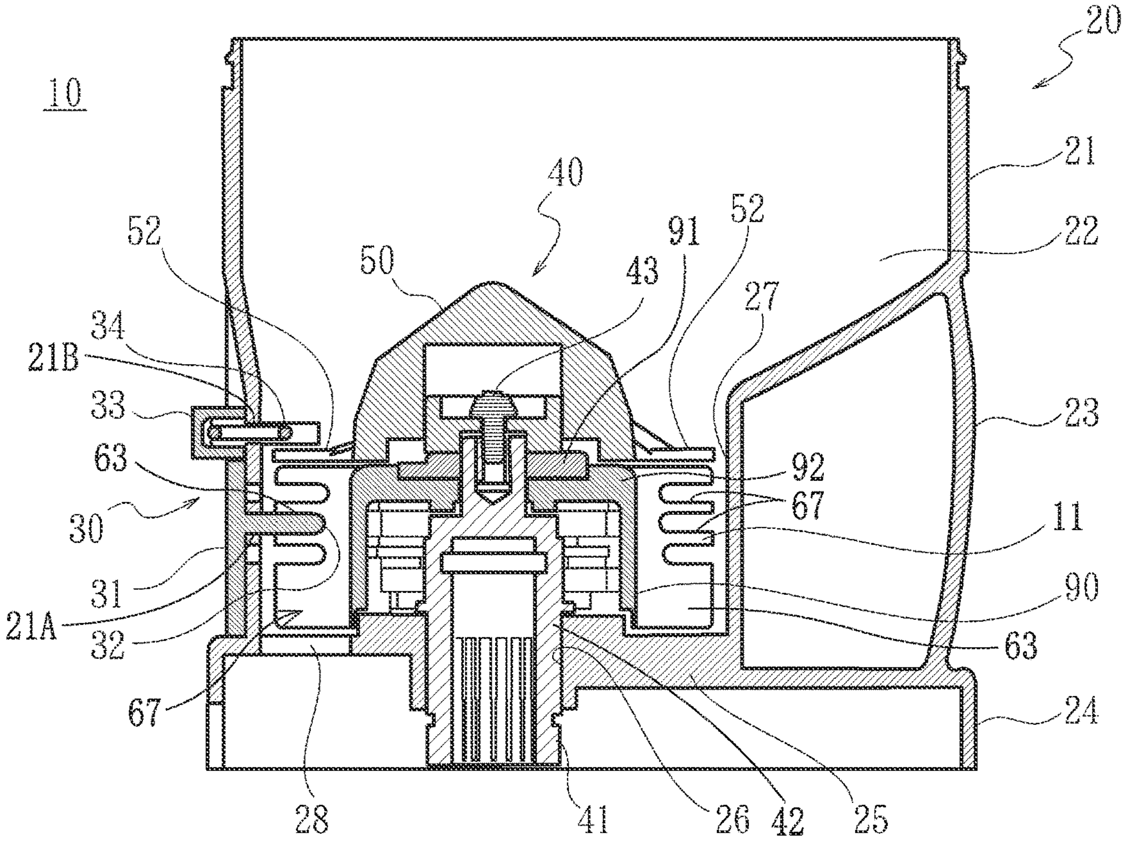
FIG. 1A is a vertical sectional view of the tablet cassette with an upper lid removed.
Figure 1B:
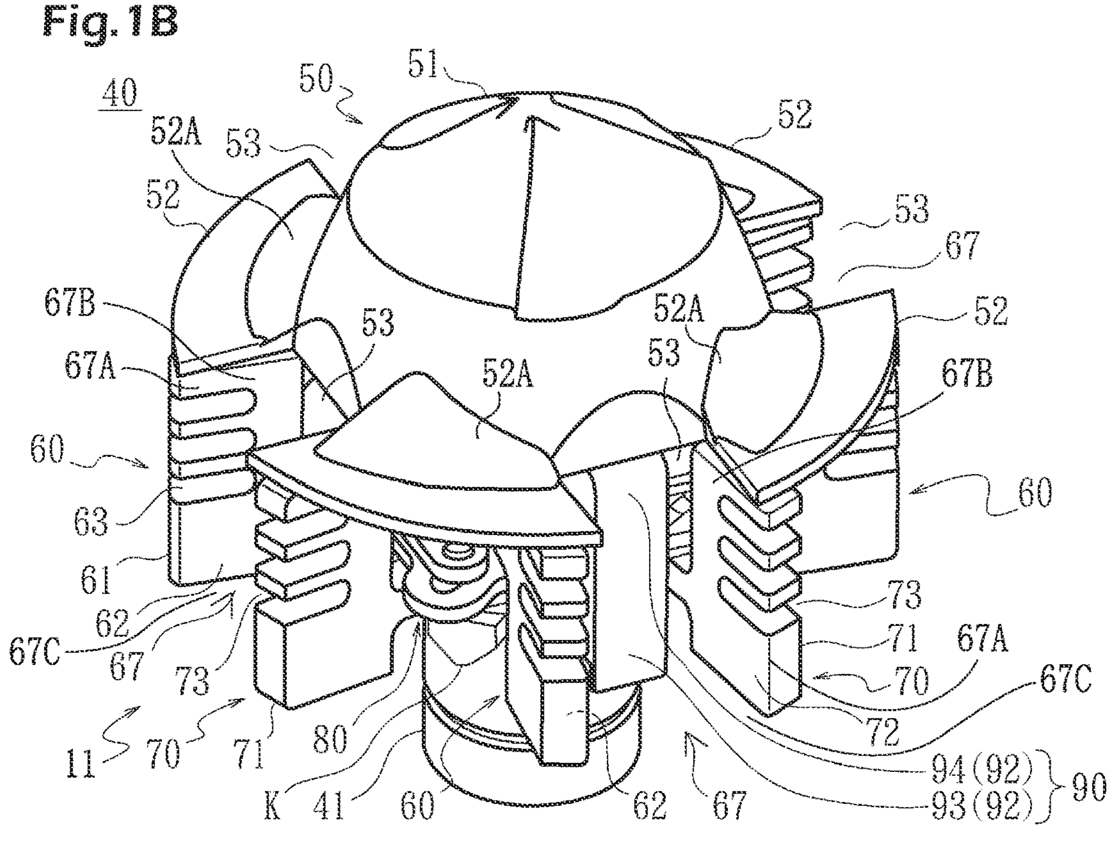
FIG. 1B is a perspective view illustrating the appearance of a rotor.
Figure 2A:
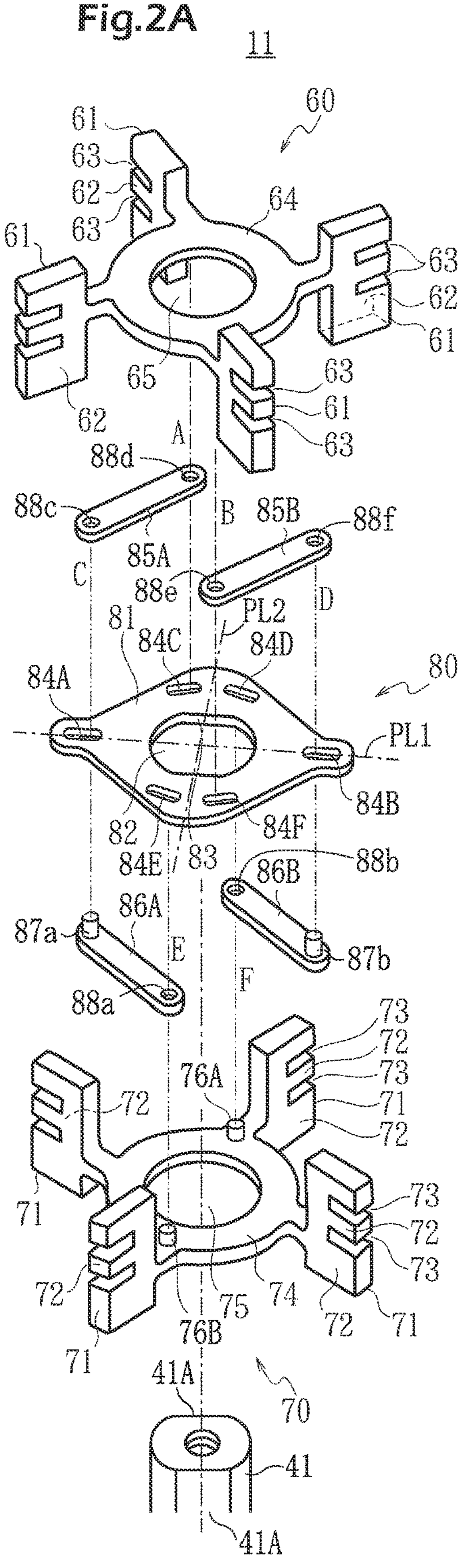
FIG. 2A is a developed perspective view as seen from above.
Figure 2B:
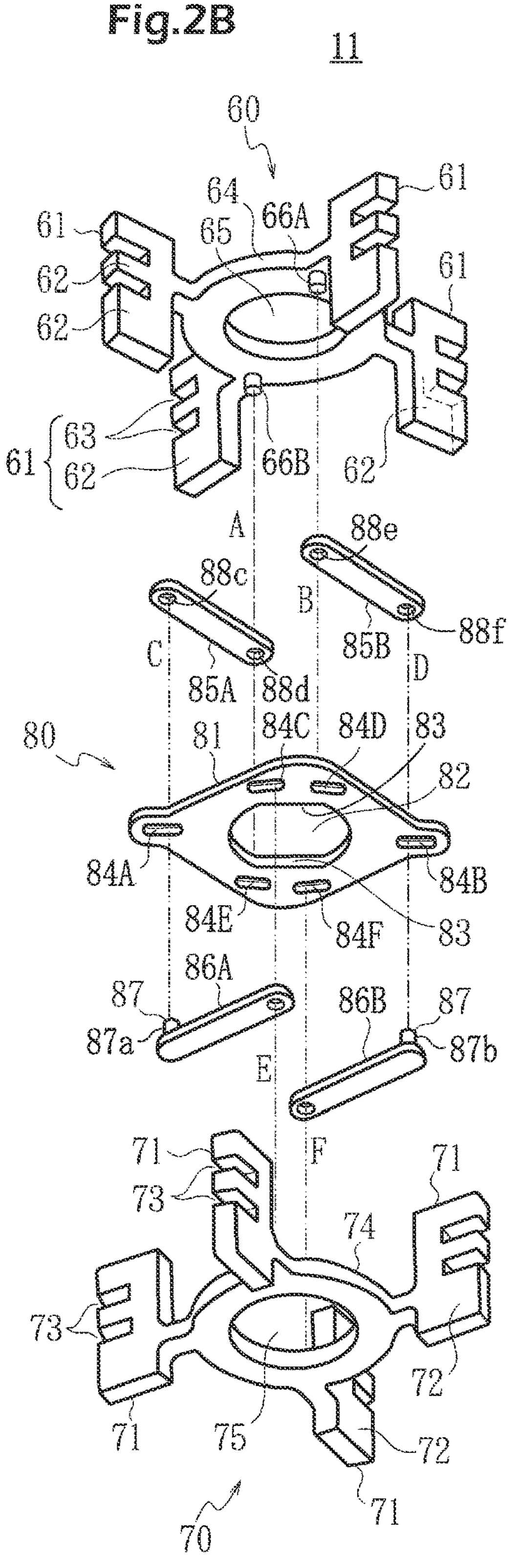
FIG. 2B is a developed perspective view as seen from below, with a rotary shaft not illustrated in FIG. 2B.
Figure 3A:
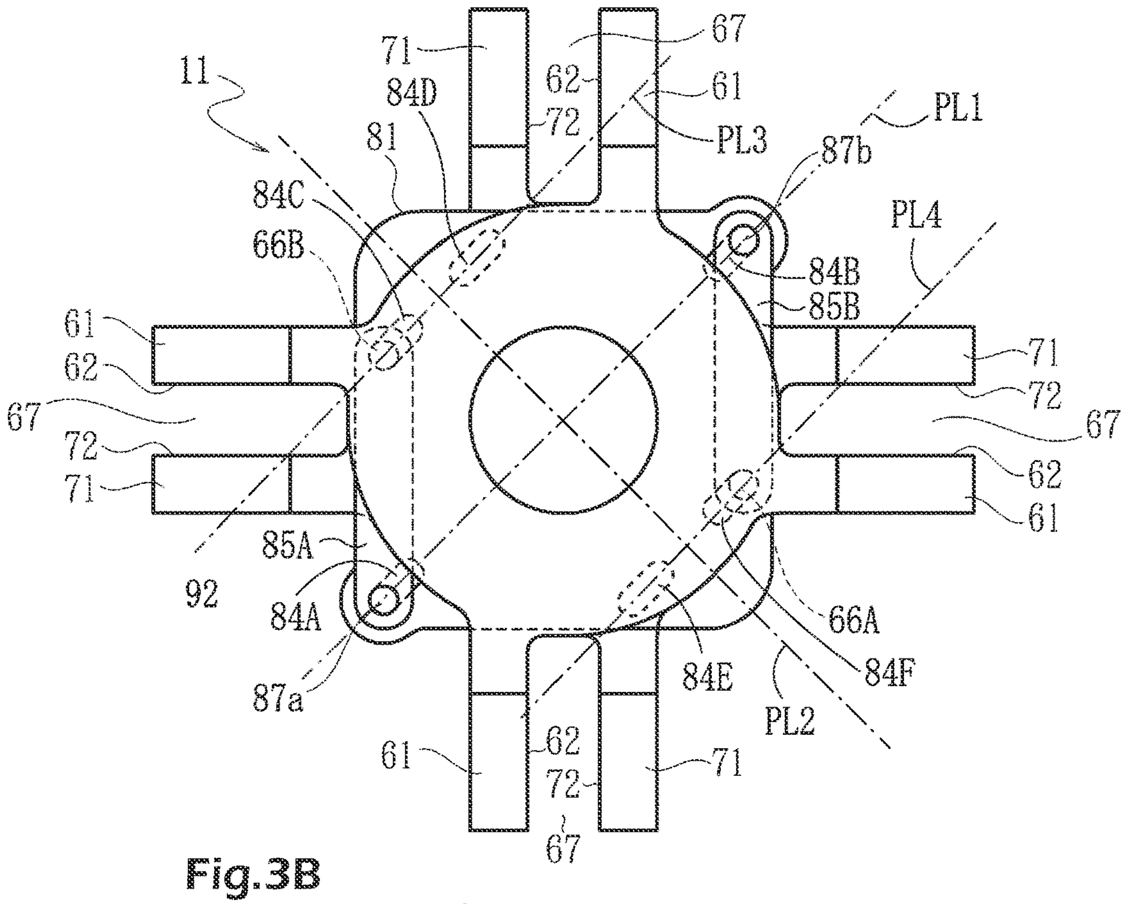
FIG. 3A illustrates a contracted state.
Figure 3B:
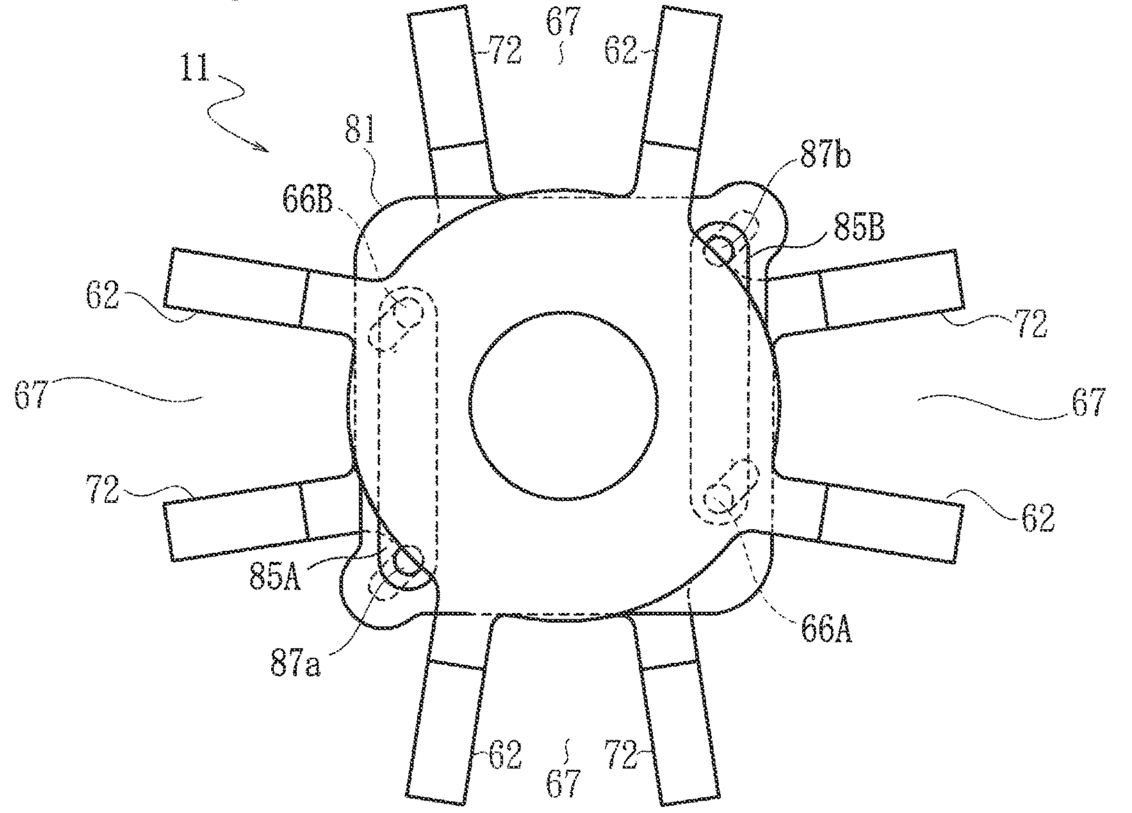
FIG. 3B illustrates an expanded state.

A first embodiment illustrated in FIGS. 1 to 3 is described. FIG. 1A is a vertical sectional view of a tablet cassette 10 with an upper lid removed. FIG. 1B is a perspective view illustrating the appearance of a rotor 40 including a cap member 50. FIGS. 2A and 2B are each a developed perspective view of a circumferential expansion-contraction mechanism 11, illustrating the circumferential expansion-contraction mechanism 11 as seen from obliquely above and obliquely below, respectively. FIG. 3A is a plan view illustrating a state in which the circumferential widths of tablet receiving portions 67 have been reduced by the circumferential expansion-contraction mechanism 11. FIG. 3B is a plan view illustrating a state in which the circumferential widths of the tablet receiving portions 67 have been increased by the circumferential expansion-contraction mechanism 11.

The tablet cassette 10 (see FIG. 1) includes a tablet container 20 and the rotor 40.

The tablet container 20 includes a box-shaped container body 21 manufactured by injection molding etc. of plastic. The internal space of the container body 21 serves as a tablet containing space 22 for containing a large number of tablets in a random manner. The container body 21 is configured such that the tablet containing space 22 may be opened and closed by the upper lid (not illustrated) during replenishment with tablets etc. A grip 23 for carriage is provided on the outer side of the container body 21. The lower part of the container body 21 serves as an attachment-detachment portion 24 to be attached to a drive portion (base) (not illustrated).

A discharge port 28 is formed as a through hole at one location (left side in FIG. 1A) of a bottom wall portion 25 of the container body 21 of the tablet container 20. When the rotor 40 is rotated by a rotary shaft 41 and the tablets are carried to a location above the discharge port 28, the tablets fall downward through the discharge port 28.

Further, the container body 21 of the tablet container 20 is removably provided with a partition unit 30. The partition unit 30 includes a partition holding portion 31 to be mounted to the container body 21 from the outside, and a partition functioning portion 32 in a thin plate shape to be inserted into the tablet containing space 22 through a slit 21A in the container body 21 to be located above the discharge port 28. The partition functioning portion 32 allows tablets below the partition functioning portion 32 to fall down, but does not allow tablets above the partition functioning portion 32 to fall down, to enable the tablets to consecutively fall down.

A belt holding portion 33 is also mounted to the container body 21 of the tablet container 20 from the outside. The belt holding portion 33 is removable. The belt holding portion 33 holds an elastic endless belt 34 in the shape of round string and made of rubber, for example, in a tense state. The configuration of the partition functioning portion 32 and the configuration of the belt holding portion 33 and the endless belt 34 in the shape of round string are described in detail in Japanese Unexamined Patent Application Publication No. 2015-12893 (JP 2015-12893 A), which is a prior application by the present applicant. When the partition unit 30 is mounted to the container body 21 and the endless belt 34 is inserted into the tablet containing space 22 through a slit 21B in the container body 21, the endless belt 34 is located above the discharge port 28 and the partition functioning portion 32. When such an elastic endless belt 34 is disposed, tablets which are placed on an overhanging portion 52 of a cap member 50 to be discussed later and are not likely to fall down into the tablet receiving portions 67 are lightly flipped, or pressed while changing the portion of abutment, by the endless belt 34 above the overhanging portion 52, to change the positions or the postures of the tablets. Therefore, the tablets are quickly moved onto a nearby tablet receiving portion 67. Thus, undesirable residence of tablets can be easily and adequately avoided even if the overhanging portions 52 of the cap member 50 are large.

The rotor 40 (see FIG. 1) defines a plurality of tablet receiving portions (four tablet receiving portions 67 in the present example) in the bottom region of the tablet containing space 22 when the rotor 40 is housed in the tablet container 20 to be rotatable by the rotary shaft 41, as with the rotor according to the related art described in JP 2015-12893 A. Tablets having fallen down into a tablet receiving portion 67 fall down through the discharge port 28 when the rotor 40 is rotated and the tablet receiving portion 67 is located above the discharge port 28.

The rotor 40 includes the cap member 50, the circumferential expansion-contraction mechanism 11, and a radial expansion-contraction mechanism 90, which are not provided in the rotor according to the related art, in order that the plurality of tablet receiving portions 67 can be easily expanded and contracted together (in conjunction) with each other. The radial expansion-contraction mechanism 90 according to the present embodiment is structured such that advancing-retracting members 92 including facing wall portions 93 including sectioning surfaces 93A are manually adjusted in position one by one, as in the tablet cassette described in Japanese Patent No. 3372121. The cap member 50, the circumferential expansion-contraction mechanism. 11, and the radial expansion-contraction mechanism 90 are externally mounted on the rotary shaft 41 to be rotated along with axial rotation of the rotary shaft 41.

The rotary shaft 41 is inserted into a through hole 26 in the bottom wall portion 25 of the tablet container 20 to rotatably penetrate the bottom wall portion 25. The lower end portion of the rotary shaft 41 projects out of the bottom wall portion 25 to be fitted and engaged with a rotary drive shaft of the drive portion (not illustrated).

The upper portion of the rotary shaft 41 serves as an inserted portion 42 to be located in the tablet containing space 22 in the container body 21. The circumferential expansion-contraction mechanism 11 and the radial expansion-contraction mechanism 90 are externally mounted on the inserted portion 42 and fixed by a setscrew 43 etc. The cap member 50 is mounted on top of such components.

When the rotor 40 is mounted to the bottom wall portion 25 of the tablet container 20 in this manner, four tablet receiving portions 67 are defined in the present example between the outer peripheral portion of the rotor 40 and an inner peripheral surface 27 of the container body 21. As illustrated in FIG. 1B, the four tablet receiving portions 67 each include a radially opening portion 67A that opens in the radial direction of the rotary shaft 41, a pair of axially opening portions 67B and 67C that open on both sides in the axial direction in which the axial line of the rotary shaft 41 extends, the facing wall portion 93 which faces the radially opening portion 67A, and a pair of side wall portions 61 and 71 which are a first wall portion and a second wall portion that face each other in the circumferential direction of the rotary shaft 41.

The circumferential expansion-contraction mechanism 11 (see FIGS. 1 and 2) includes a first turning member 60 on the upper side in the present example, a second turning member 70 on the lower side in the present example, and a link mechanism 80 provided therebetween, in order to enable the four tablet receiving portions 67 to be expanded and contracted in the circumferential direction in conjunction with each other. That is, the circumferential expansion-contraction mechanism 11 includes: the first turning member 60 including the first side wall portions 61 of the pairs of side wall portions 61 and 71 disposed at predetermined intervals in the circumferential direction of the rotary shaft 41, and operable to relatively turn about the axial line of the rotary shaft 41 within a predetermined angular range; the second turning member 70 including the second side wall portions 71 of the pairs of side wall portions 61 and 71 disposed at predetermined intervals in the circumferential direction, and operable to relatively turn about the axial line within the predetermined angular range; and the link mechanism 80 configured to couple the first turning member 60 and the second turning member 70 in an interlocking manner. The link mechanism 80 is configured such that when one of the first turning member 60 and the second turning member 70 is turned toward one side in the circumferential direction by a predetermined angle through a manual operation, the other of the first turning member 60 and the second turning member 70 is turned toward the other side in the circumferential direction by an angle equal to the predetermined angle.

A specific description follows. The first turning member 60 includes: a first turning plate 64 in the shape of a circular plate with a hole in which a first through hole 65 that allows insertion of the rotary shaft 41 is formed at the center thereof; four side wall portions 61 configured to radially extend in the radial direction at intervals of equal angles from the first turning plate 64; and two pins 66A and 66B provided on the lower surface of the first turning plate 64 to project toward a second movable plate 74. The two pins 66A and 66B are disposed at positions 180 degrees away from each other about the axial line of the first turning plate 64. A sectioning surface 62 on one side of each of the side wall portions 61 serves as one of circumferential facing surfaces of each of the tablet receiving portions 67. A plurality of grooves 63 (three are illustrated in FIG. 1, and only two are illustrated in FIG. 2 and the subsequent drawings) for avoiding interference with the partition functioning portion 32 are formed at the outer end portions of the side wall portions 61.

The second turning member 70 includes: a second turning plate 74 in the shape of a circular plate with a hole in which a second through hole 75 that allows insertion of the rotary shaft 41 is formed at the center thereof; four side wall portions 71 configured to radially extend in the radial direction at intervals of equal angles from the second turning plate 74; and two pins 76A and 76B provided on the upper surface of the second turning plate 74. The two pins 76A and 76B are disposed at positions 180 degrees away from each other about the axial line of the second turning plate 74. A sectioning surface 72 on one side of each of the side wall portions 71 serves as the other of the circumferential facing surfaces of each of the tablet receiving portions 67. A plurality of grooves 73 (three are illustrated in FIG. 1, and only two are illustrated in FIG. 2 and the subsequent drawings) for avoiding interference with the partition functioning member 32 are also formed at the outer end portions of the side wall portions 71.

The inside diameters of the through holes 65, 75 are slightly larger than the outside diameter of the rotary shaft 41, and both the first turning member 60 and the second turning member 70 are loosely engaged with the rotary shaft 41, and thus are rotatable about the rotary shaft 41 which is inserted into the through holes 65, 75.

The link mechanism 80 includes: a base plate 81 in the shape of a rectangular plate in which six elongated through holes 84A to 84F that allow insertion of the pair of pins 66A and 66B and the pair of pins 76A and 76B are formed at the peripheral edge portion thereof; and first and second links 85A and 85B and third and fourth links 86A and 86B each in the shape of an elongated plate body. A through hole 82 that allows insertion of the rotary shaft 41 is formed at the center of the base plate 81. The through hole 82 is not a perfect circle but has a pair of straight engagement portions 83, unlike the first and second through holes 65, 75 discussed above. Straight engagement surfaces 41A to be engaged with the straight engagement portions 83 are formed at the outer peripheral portion on the distal end side of the rotary shaft 41. With the straight engagement portions 83 facing the straight engagement surfaces 41A of the rotary shaft 41, the base plate 81 is rotated together with the rotary shaft 41. In other words, the base plate 81, among the constituent components of the link mechanism 80, is not rotatable with respect to the rotary shaft 41 which is inserted into the through hole 82.

Small fitting holes 88*a* to 88*f* are formed at both ends of the two links 85A and 85B and the two links 86A and 86B. The two links 86A and 86B have small fitting holes 88*a* and 88*b*, respectively, formed at one end portion, and small coupling pins 87*a* and 87*b*, respectively, provided at the other end portion. The coupling pins 87*a* and 87*b* and the pins 66A, 66B discussed above are inserted into one of the elongated through holes 84A to 84F in the base plate 81 and one of the fitting holes 88*a* to 88*f* in the two links 85A and 85B and the two links 86A and 86B (see the dash-double-dot lines A, B, C, D, E, and F in FIG. 2 for the more specific engagement relationship; each of the dash-double-dot lines indicates the elongated hole and the fitting hole into which the pin on the line is to be inserted). Then (see FIG. 3), the sectioning surfaces 62 of the side wall portions 61 of the first turning member 60 and the sectioning surfaces 72 of the side wall portions 71 of the second turning member 70 face each other to define the circumferential widths of the tablet receiving portions 67.

A more specific description follows. The first turning member 60 includes a first turning plate 64 having a first through hole 65 through which the rotary shaft 41 passes and a plurality of the first side wall portions provided at the outer peripheral portion of the first turning plate 64, and a pair of first and second pins 66A and 66B provided on a surface of the first turning plate 64 facing the second turning member 70 at positions 180 degrees away from each other about the axial line of the first turning plate 64, the first and second pins 66A and 66B extending toward the second turning member 70. The second turning member 70 includes a second turning plate 74 having a second through hole 75 through which the rotary shaft 41 passes and a plurality of the second side wall portions provided at the outer peripheral portion of the second turning plate 74, and a pair of third and fourth pins 76A and 76B provided on a surface of the second turning plate 74 facing the first turning plate 64 at positions 180 degrees away from each other about the axial line of the second turning plate 74, the third and fourth pins 76A and 76B extending toward the first turning plate 64.

The link mechanism 80 includes a base plate 81 disposed between the first turning plate 64 and the second turning plate 74 and having a third through hole 82 through which the rotary shaft 41 passes, and a pair of first and second elongated through holes 84A and 84B provided at positions 180 degrees away from each other about the axial line to extend in the radial direction. On the assumption that a first imaginary line PL1 (FIG. 3) passes through the pair of the first and second elongated through holes 84A and 84B; a second imaginary line PL2 extends orthogonally to the first imaginary line PL1 and extends orthogonally to the axial line; and a third imaginary line PL3 and a fourth imaginary line PL4 extend orthogonally to the second imaginary line PL2 respectively on both sides of the radial direction of the third through hole 82, the base plate 81 has a pair of third and fourth elongated through holes 84C and 84D located line-symmetrically with respect to the second imaginary line PL2 and extending along the third imaginary line PL3, and a pair of fifth and sixth elongated through holes 84E and 84F located line-symmetrically with respect to the second imaginary line PL2 and extending along the fourth imaginary line PL4.

The link mechanism 80 further includes first to fourth links 85A to 86B. The first link 85A is located between the first turning plate 64 and the base plate 81, and has a first fitting hole 88*d* and a second fitting hole 88*c*. The first fitting hole 88*d* is provided at one end of the first link 85A to be turnably fitted with the second pin 66B. The second fitting hole 88*c* is provided at the other end of the first link 85A to be turnably fitted with a sixth pin 87*a* penetrating the first elongated through hole 84A provided in the base plate 84. The second link 85B is located between the first turning plate 64 and the base plate 81, and has a third fitting hole 88*e* and a fourth fitting hole 88*f*. The third fitting hole 88*e* is provided at one end of the second link 85B to be turnably fitted with the first pin 66A. The fourth fitting hole 88*f* is provided at the other end of the second link 85B to be turnably fitted with a fifth pin 87*b* of the third link 86B, to be discussed later, penetrating the second elongated through hole 84B provided in the base plate 81. The third link 86B is located between the second turning plate 74 and the base plate 81, and has a fifth fitting hole 88*b* and the fifth pin 87*b*. The fifth fitting hole 88*b* is provided at one end of the third link 86B to be turnably fitted with the third pin 76A. The fifth pin 87*b* is provided at the other end of the third link 86B to penetrate the second elongated through hole 84B provided in the base plate 81. The fourth link 86A is located between the second turning plate 74 and the base plate 81, and has a sixth fitting hole 88*c* and the sixth pin 87*a*. The sixth fitting hole 88*c* is provided at one end of the fourth link 86A to be turnably fitted with the fourth pin 76B. The sixth pin 87*a* is provided at the other end of the fourth link 86A to penetrate the first elongated through hole 84A provided in the base plate 81.

The first pin 66A is slidably fitted with the sixth elongated through hole 84F. The second pin 66B is slidably fitted with the third elongated through hole 84C. The third pin 76A is slidably fitted with the fourth elongated through hole 84D. The fourth pin 76B is slidably fitted with the fifth elongated through hole 84E.

The respective lengths of the first to fourth links 85A to 86A, the respective lengths and positions of the first to sixth pins 66A to 87*a*, the respective positions of the first to sixth fitting holes (88*a* to 88*f*), and the respective positions and lengths of the first to sixth elongated through holes 84A to 84F are determined such that, when one of the first turning member 60 and the second turning member 70 is turned by a predetermined angle toward one side in the circumferential direction through a manual operation, the other of the first turning member 60 and the second turning member 70 is turned by an angle equal to the predetermined angle toward the other side in the circumferential direction.

When such a configuration is adopted, it is possible to provide a link mechanism 80 operable continuously using a small number of types of components.

With the present embodiment, assembly of the link mechanism is completed by fitting of the pins, the fitting holes, and the elongated holes. Both the first turning member 60 and the second turning member 70 are coupled to the link mechanism 80. When one of the first side wall portions 61, of the side wall portions 61, 71 which define the plurality of tablet receiving portions 67, is rotated toward one side in the circumferential direction with respect to the rotary shaft 41 through a hand or finger operation, the other, remaining first side wall portions 61 are rotated toward the same side by the same amount. At the same time, all the others (e.g. the second side wall portions 71) of the side wall portions 61, 71 are rotated about the axis toward the opposite side (toward the other side in the circumferential direction) by the same amount through operation of the link mechanism 80, and the circumferential widths of all the tablet receiving portions 67 are expanded and contracted together with the middle position fixed. Likewise, also when an operation of expanding and contracting the facing distance between the side wall portions 61, 71 which interpose the tablet receiving portion 67 is performed by individually gripping both the side wall portions 61, 71 with the right and left hands, for example, the circumferential widths of all the tablet receiving portions 67 are expanded and contracted with the middle position fixed.

The radial expansion-contraction mechanism 90 which is used in the present embodiment individually expands and contracts the plurality of tablet receiving portions 67 in the radial direction. The radial expansion-contraction mechanism 90 according to the present embodiment is structured such that the four advancing-retracting members 92 including the facing wall portions 93 including the sectioning surfaces 93A are manually adjusted in position one by one, as in the tablet cassette described in Japanese Patent No. 3372121. The position adjustment structure may be configured in any manner, and may be configured such that the four advancing-retracting members 92 are moved at the same time in conjunction with each other.

Figure 4A:
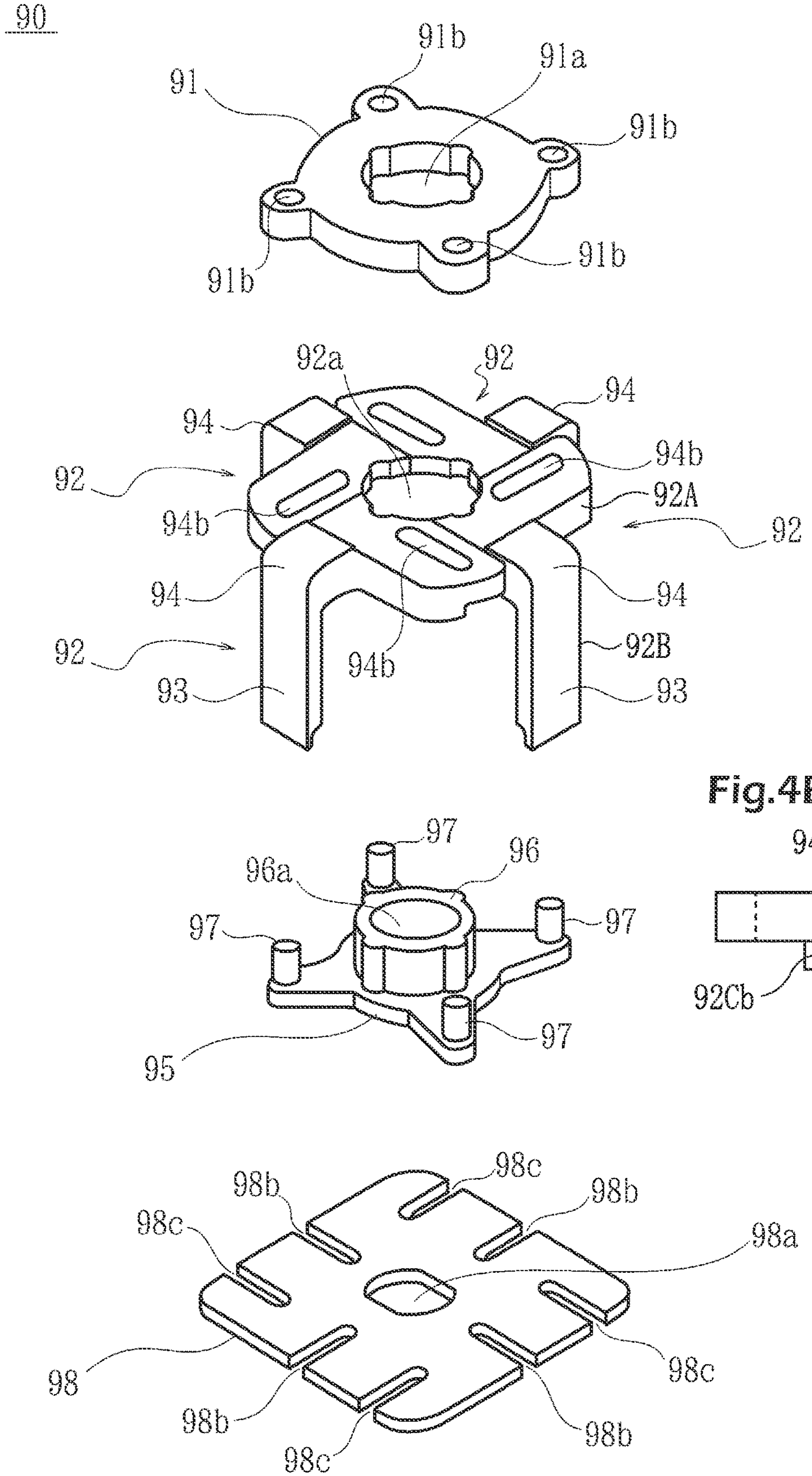
FIG. 4A is a developed perspective view illustrating the structure of a radial expansion-contraction mechanism according to a second embodiment.
Figure 4B:
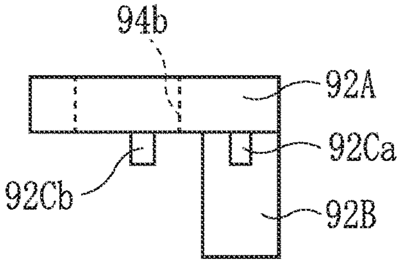
FIG. 4B is a side view of an advancing-retracting member.
Figure 5A:
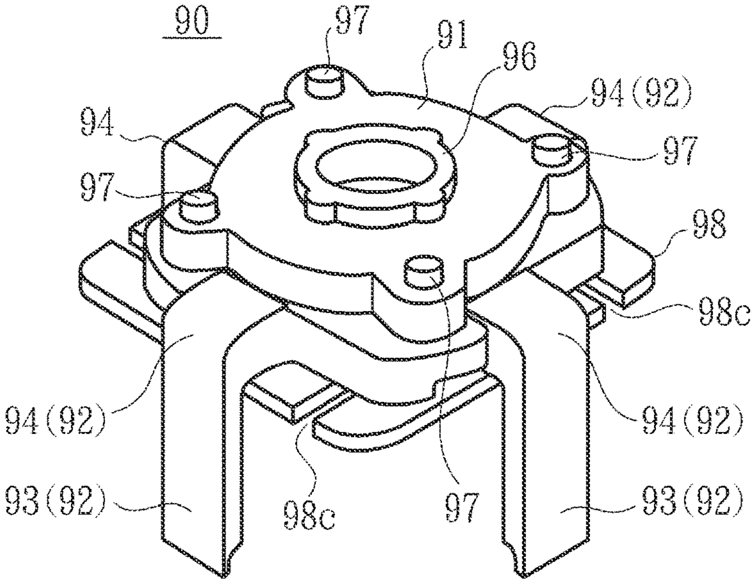
FIG. 5A is a perspective view illustrating the appearance in a contracted state.

FIGS. 4A, 4B, and 5A illustrate an example of the configuration of the radial expansion-contraction mechanism 90 operable to expand and contract all the plurality of tablet receiving portions 67 by the same distance in the radial direction in conjunction with each other, as with the movable piece drive mechanism described in Patent Document 2 discussed earlier. Specifically, the radial expansion-contraction mechanism 90 includes an operation rotary member 91 disposed at the uppermost location to be easily rotationally operable through a manual or finger operation or using a hand-held tool, a plurality of advancing-retracting members 92 radially provided below the operation rotary member 91 along an imaginary circle, a follower rotary member 95 disposed below the advancing-retracting members 92, and a guide member 98 disposed at the lowermost location. The number of the advancing-retracting members 92 is four, which is the same as that of the tablet receiving portions 67, and the arrangement of the four advancing-retracting members 92 also corresponds to that of the four tablet receiving portions 67.

The four advancing-retracting members 92 each include a base portion 92A penetrated by a long hole 94*b*, and a suspending portion 92B that slightly projects radially outward and then extends downward. The radially outer side of the suspending portion 92B constitutes the facing wall portion (sectioning surface) 93. An upper end portion 94 of the facing wall portion 93 has a rounded curved surface so that the tablets are not caught.

The facing wall portion 93 faces the inner peripheral surface 27 of the tablet container 20 on the outer side to define a surface of the tablet receiving portion 67 on the inner side in the radial direction.

A tubular portion 96 with a relatively large diameter is formed at the center of the follower rotary member 95. The follower rotary member 95 is provided with four pins 97 arranged at equal intervals in the circumferential direction along an imaginary circle that is concentric with the tubular portion 96, as with the arrangement of the advancing-retracting members 92. The four advancing-retracting members 92 are placed on the follower rotary member 95. Further, the operation rotary member 91 is placed on the four advancing-retracting members 92. In this state, the four pins 97 penetrate the long holes 94*b* in the four advancing-retracting members 92 and holes 91*b* in the operation rotary member 91. The components are assembled such that the tubular portion 96 at the center of the follower rotary member 95 penetrates an aggregated hole 92*a* formed at the center portion of the four advancing-retracting members 92 and a hole 91*a* in the operation rotary member 91. With this configuration, the members 91, 92, and 95 are rotatable together about the rotary shaft 41 when the rotary shaft 41 is inserted into the hole 96*a* at the center of the follower rotary member 95.

The guide member 98 is a flat plate body, and includes a hole 98*a* that penetrates the center of the guide member 98 and eight guide paths 98*b*, 98*c* formed in the peripheral portion. The hole 98*a* includes a pair of straight engagement portions 99, which are similar to the straight engagement portions 83 of the through hole 82 in the base plate 81 of the link mechanism 80 discussed above. Straight engaged portions to be engaged with the pair of straight engagement portions 99 are formed at the distal end portion of the rotary shaft 41. Therefore, when the rotary shaft 41 is inserted into the hole 98*a* to mount the guide member 98 to the rotary shaft 41, the guide member 98 is not rotatable about the rotary shaft 41 with respect to the rotary shaft 41 which has been inserted.

Figure 5B:
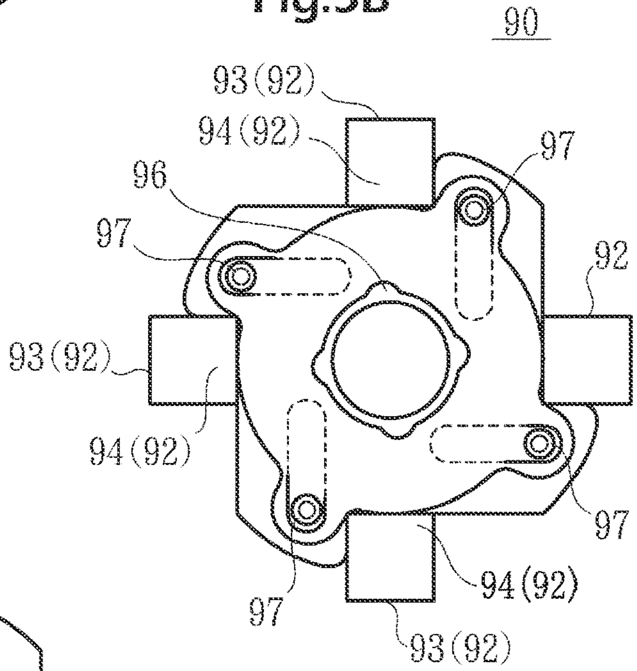
FIG. 5B is a plan view in a contracted state.
Figure 5C:
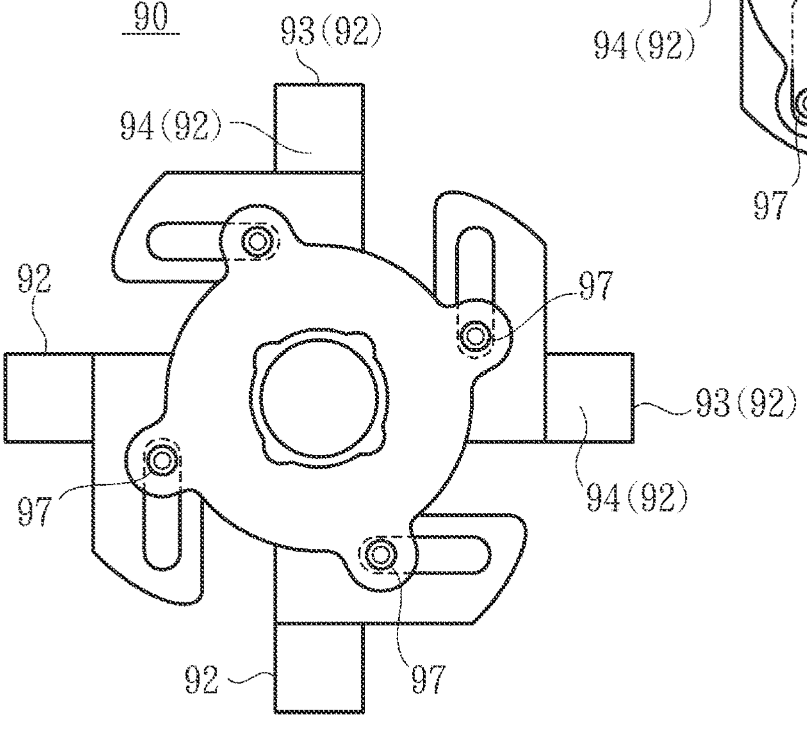
FIG. 5C is a plan view in an expanded state.

As illustrated in FIG. 4B, two protrusions 92Ca and 92Cb are formed on the lower surface of the base portion of each advancing-retracting member 92 to be loosely fitted with the guide path 98*b* and the guide path 98*c*. Therefore, when the operation rotary member 91 is rotated about the axis in the radial expansion-contraction mechanism 90 which is mounted to the rotary shaft 41, the follower rotary member 95 is also rotated together about the axis, and the pins 97 are revolved in an accompanying manner. With this revolving motion, the advancing-retracting members 92 are also urged to be revolved by the pins 97 which are inserted into the long holes 94*b*. However, the advancing-retracting members 92 are regulated to only movement in the radial direction by the guide paths 98*b*, 98*c* in the guide member 98 which is not rotatable about the rotary shaft 41. Therefore, the advancing-retracting members 92 are moved only in the radial direction (see FIGS. 5B and 5C), and thus the facing wall portions 93 are advanced and retracted with respect to the inner peripheral surface 27 which faces the facing wall portions 93. In the example in FIG. 4B, both the protrusion 92Ca, which corresponds in position to the suspending portion 92B, and the protrusion 92Cb, which corresponds in position to the long hole 94*b*, are in the shape of a circular column with a circular cross section. However, the protrusion 92Ca, which corresponds in position to the suspending portion 92B, may be in the shape of an elongated rail that extends toward the suspending portion 92B, and the protrusion 92Cb, which corresponds in position to the long hole 94*b*, may be in the shape of an elliptical column with an elliptical cross section. With this configuration, most of the protrusion 92Ca in an elongated rail shape reliably resides in the guide path 98*b*. With this configuration, smooth motion of the advancing-retracting members 92 can be secured.

The cap member 50 (see FIGS. 1A and 1B) includes a middle portion 51 having an upper surface in a mound shape that is similar to the head portion of the rotor according to the related art, and a plurality of overhanging portions 52 that overhang in the radial direction from a skirt portion of the middle portion 51. The plurality of overhanging portions 52 are generally in a plate shape, and portions 52A of the overhanging portions 52 on the side of the middle portion 51 have an inclined upper surface slightly raised to enhance the function of stirring the tablets and prevent residence of the tablets. Non-overhanging portions 53 that penetrate in the vertical direction are formed between two overhanging portions 52 that are adjacent to each other in the circumferential direction, that is, at portions above the tablet receiving portions 67. The non-overhanging portions 53 also serve as the upper end portions of the tablet receiving portions 67, that is, the axially opening portions. On the other hand, the plurality of overhanging portions 52 extend to a location close to the inner peripheral surface 27 of the container body 21, and cover a region above a space between two adjacent tablet receiving portions 67, to prevent undesirable fall of the tablets into the space between the two adjacent tablet receiving portions 67.

As illustrated in FIGS. 1B and 5, in addition, the upper end portions 94 of the facing wall portions 93 of the advancing-retracting members 92 for expanding and contracting the tablet receiving portions are positioned directly below the non-overhanging portions 53 of the cap member 50 so that the tablets smoothly fall down from the non-overhanging portions 53 into the tablet receiving portions 67.

As illustrated in FIG. 1A, further, the partition functioning portion 32 is disposed below the overhanging portions 52 so that the tablet receiving portions 67 are laterally partitioned at a height lower than the overhanging portions 52. The endless belt 34 is provided in a tense state above the overhanging portions 52.

The mode of use and operation of the tablet cassette 10 which includes the radial expansion-contraction mechanism 90 illustrated in FIGS. 4 and 5 will be described with reference to the drawings.

Figure 6A:
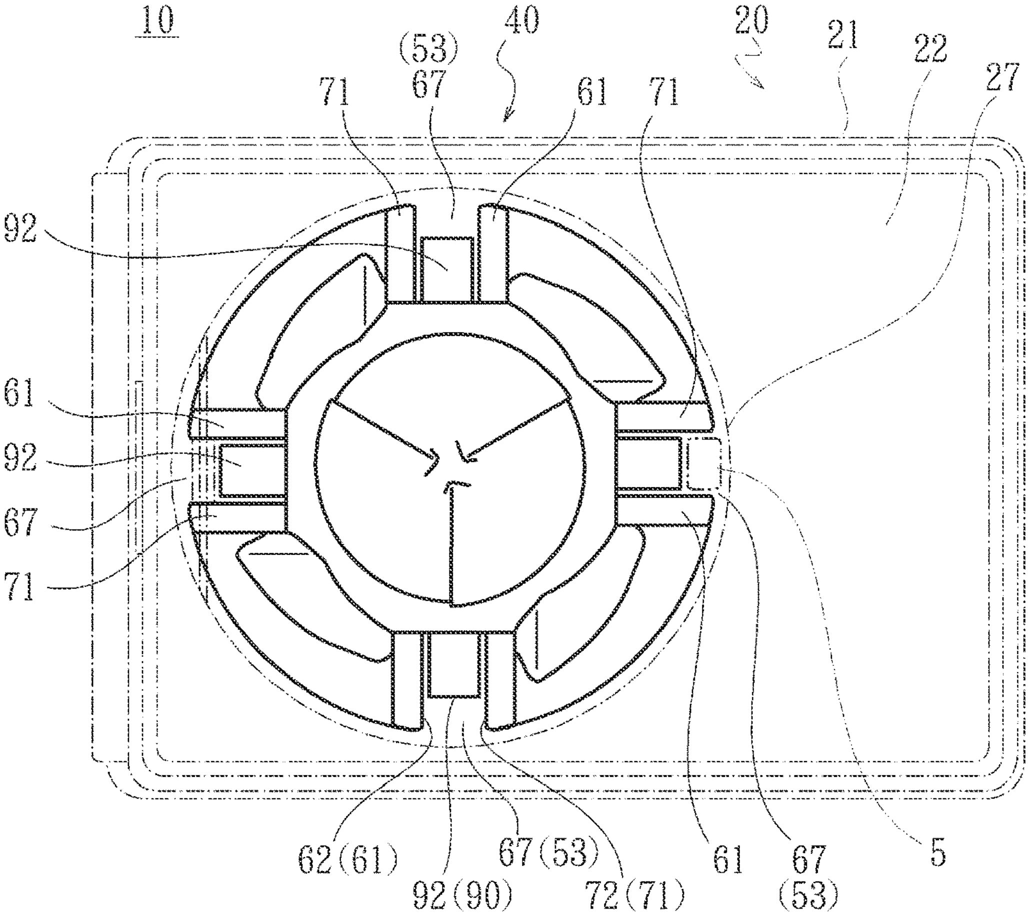
FIG. 6A is a plan view of a tablet cassette with an upper lid removed.
Figure 6B:
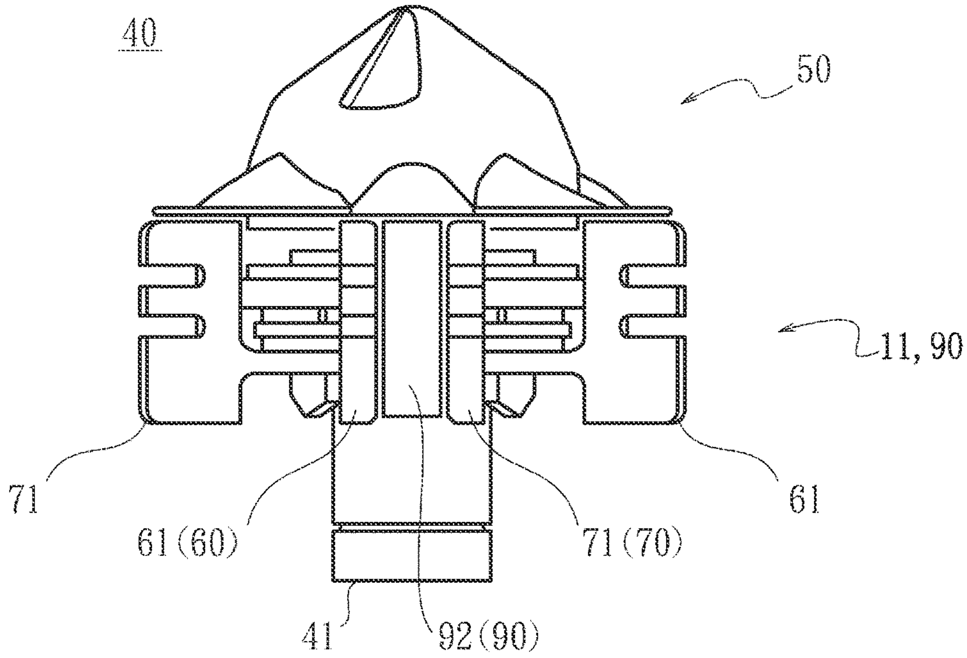
FIG. 6B is a front view of a rotor.
Figure 7A:
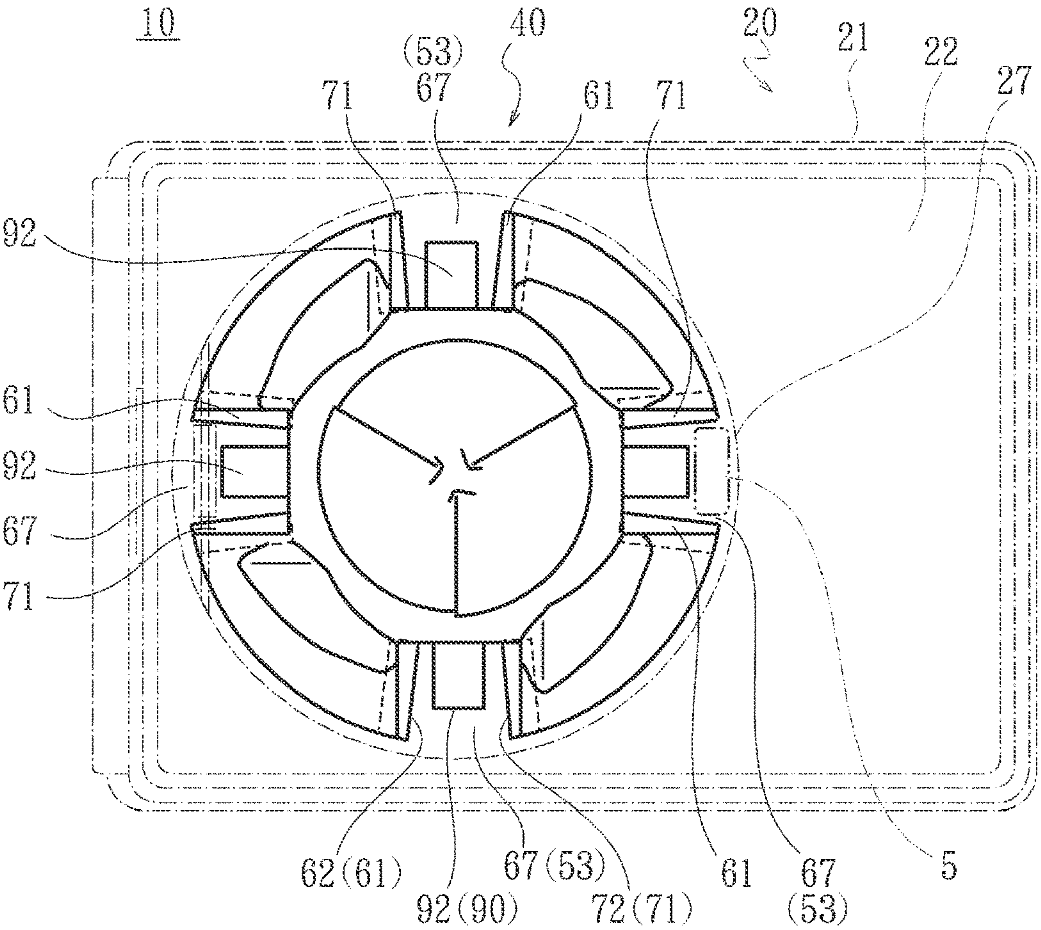
FIG. 7A is a plan view of the tablet cassette with the upper lid removed.
Figure 7B:
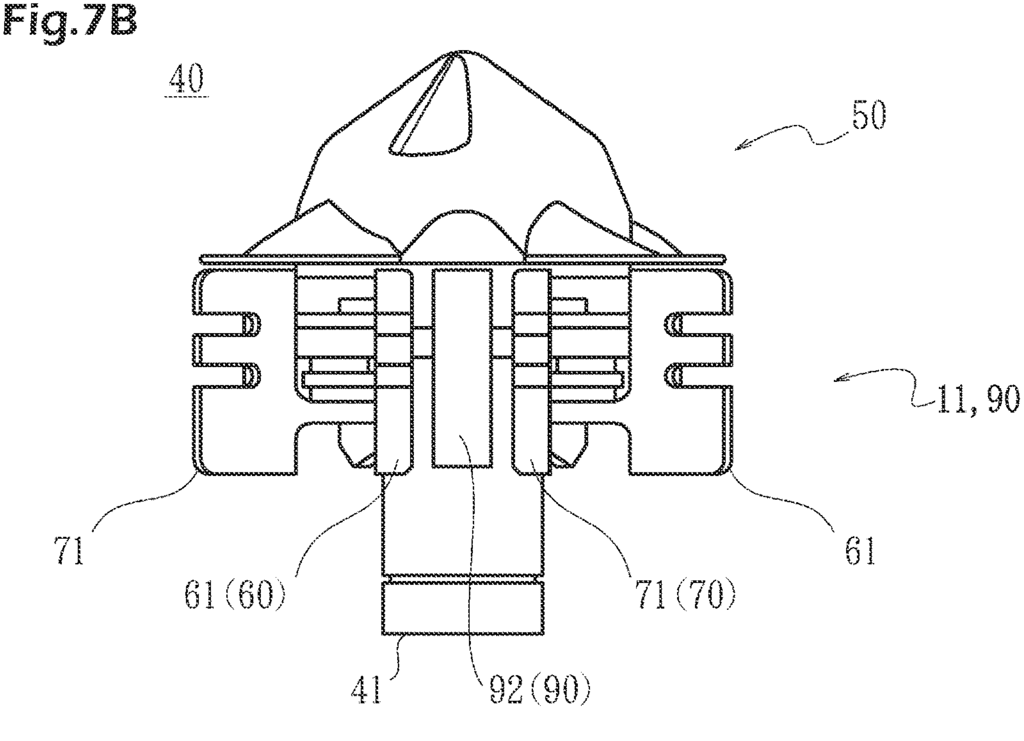
FIG. 7B is a front view of the rotor.
Figure 8A:
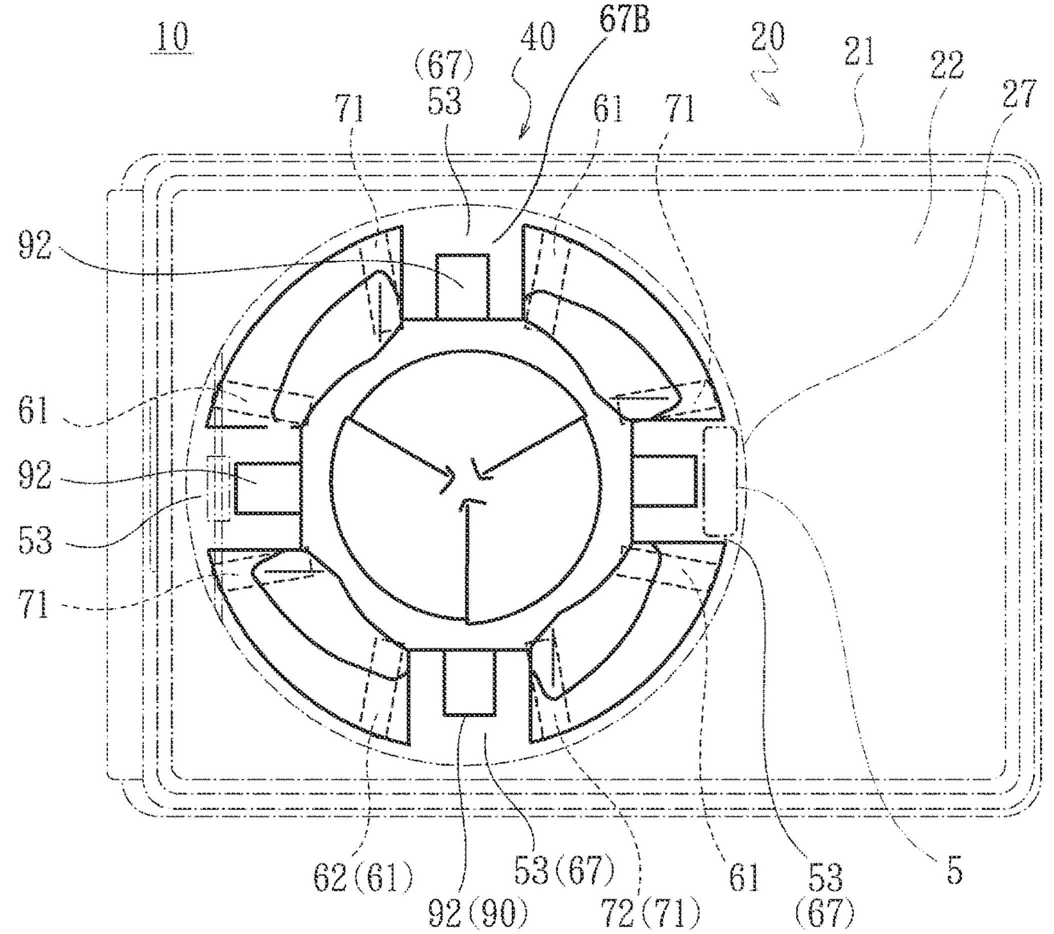
FIG. 8A is a plan view of the tablet cassette with the upper lid removed.
Figure 8B:
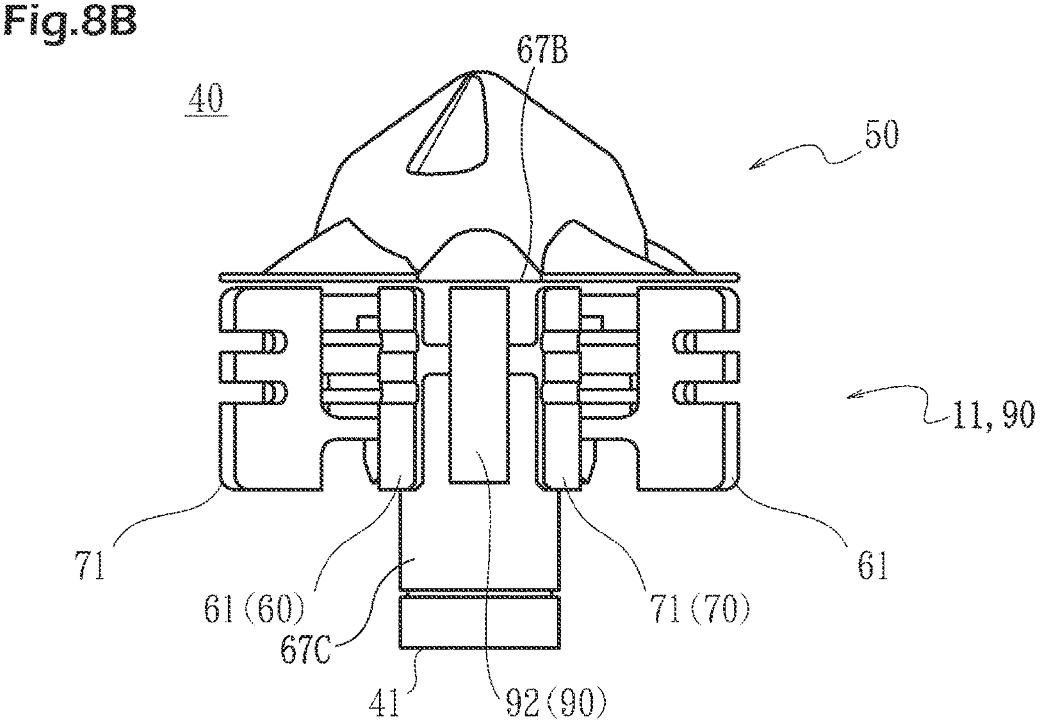
FIG. 8B is a front view of the rotor.
Figure 9A:
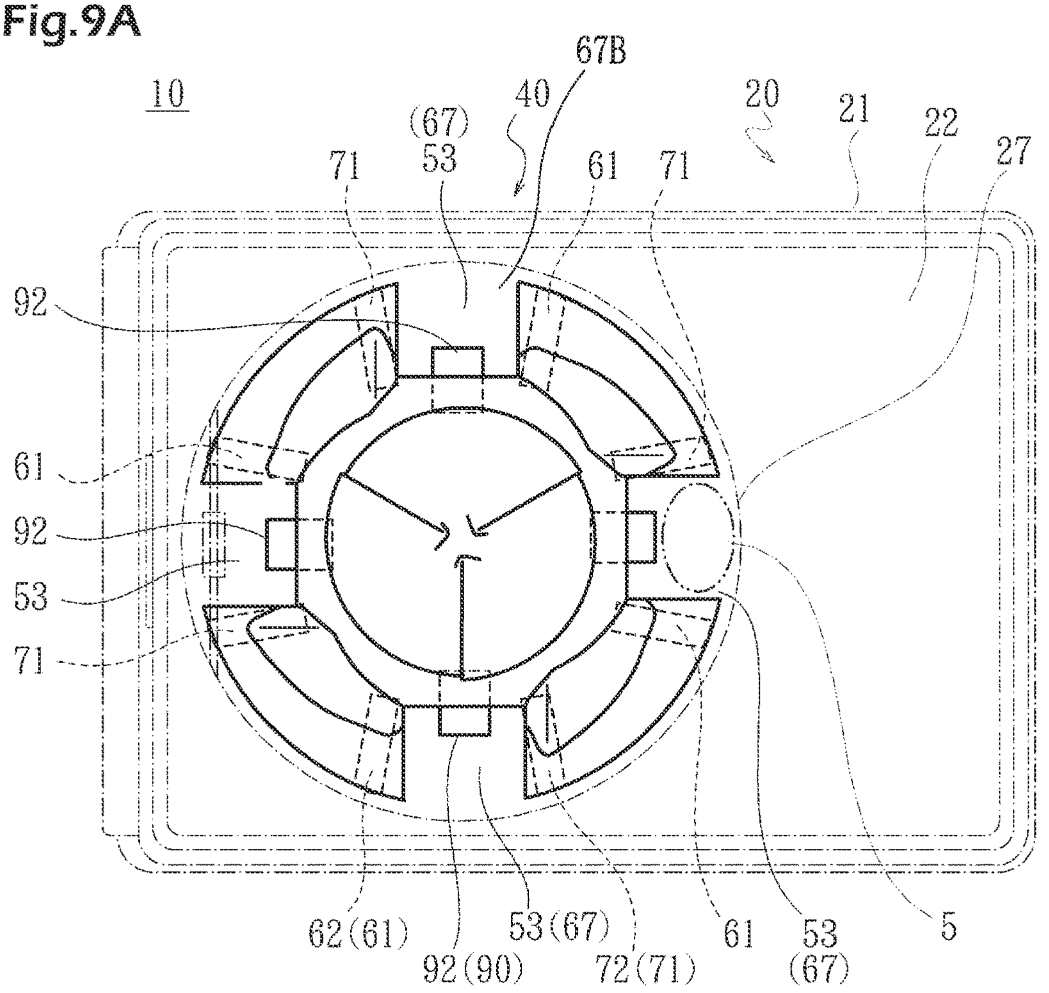
FIG. 9A is a plan view of the tablet cassette with the upper lid removed.
Figure 9B:
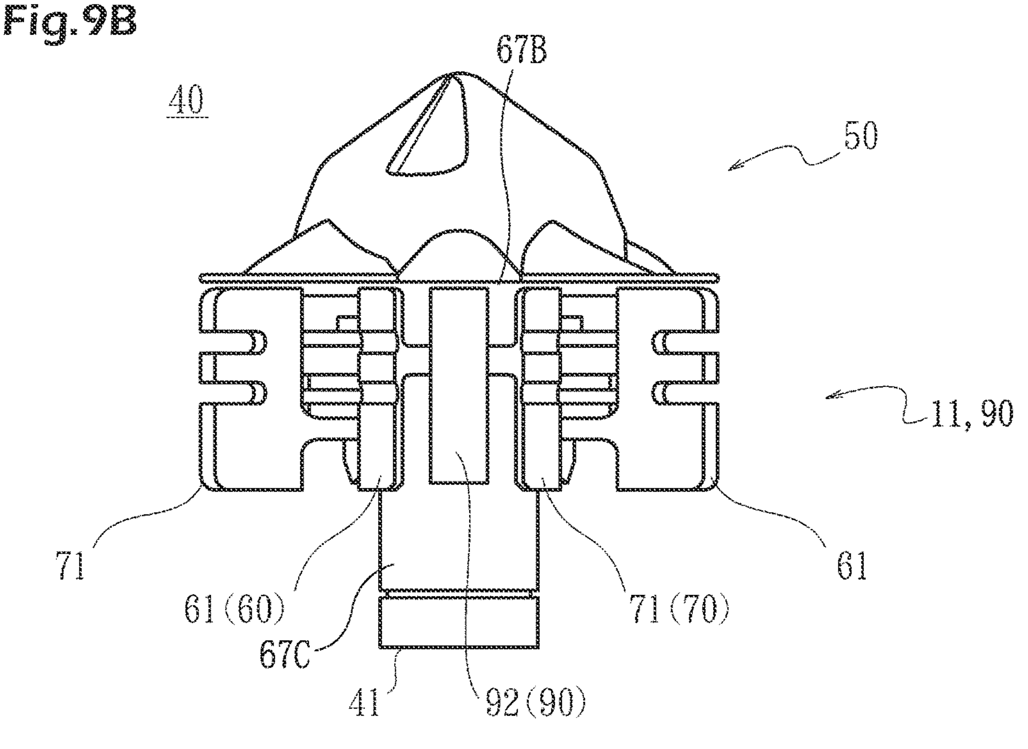
FIG. 9B is a front view of the rotor.
Figure 10A:
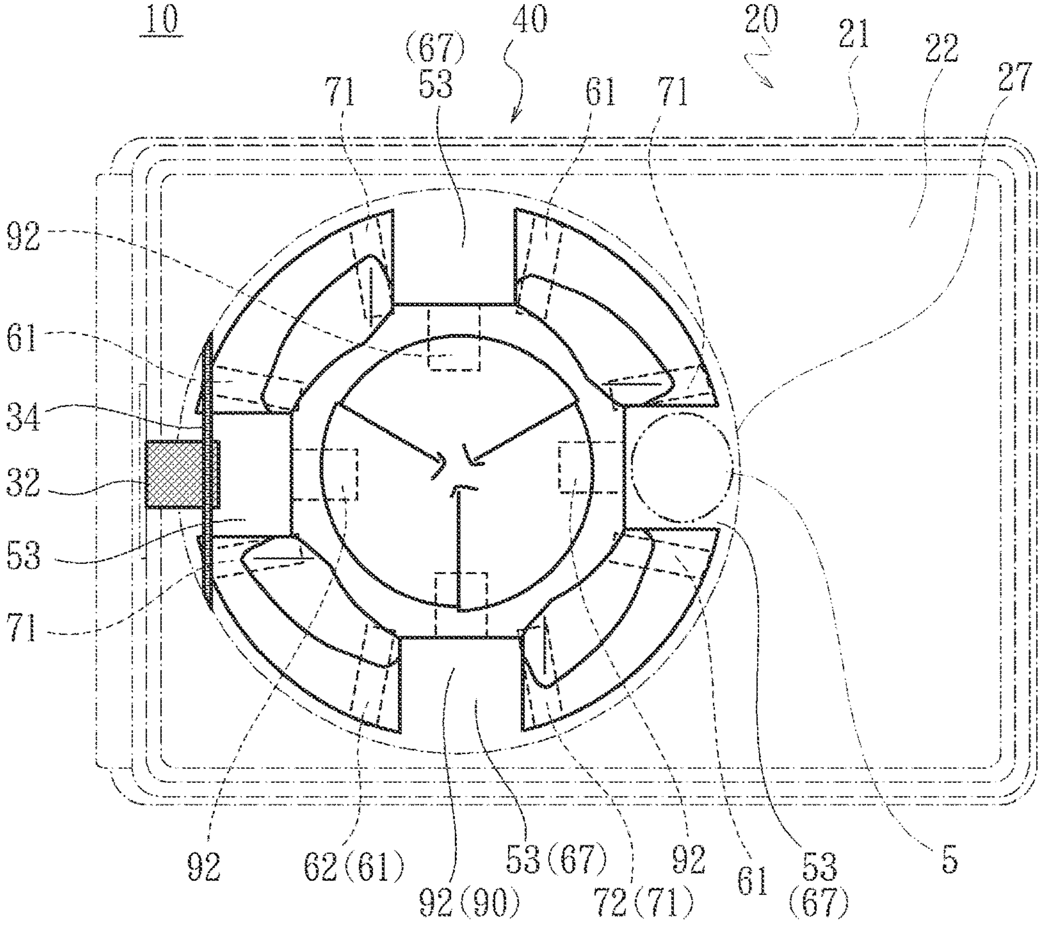
FIG. 10A is a plan view of the tablet cassette with the upper lid removed.
Figure 10B:
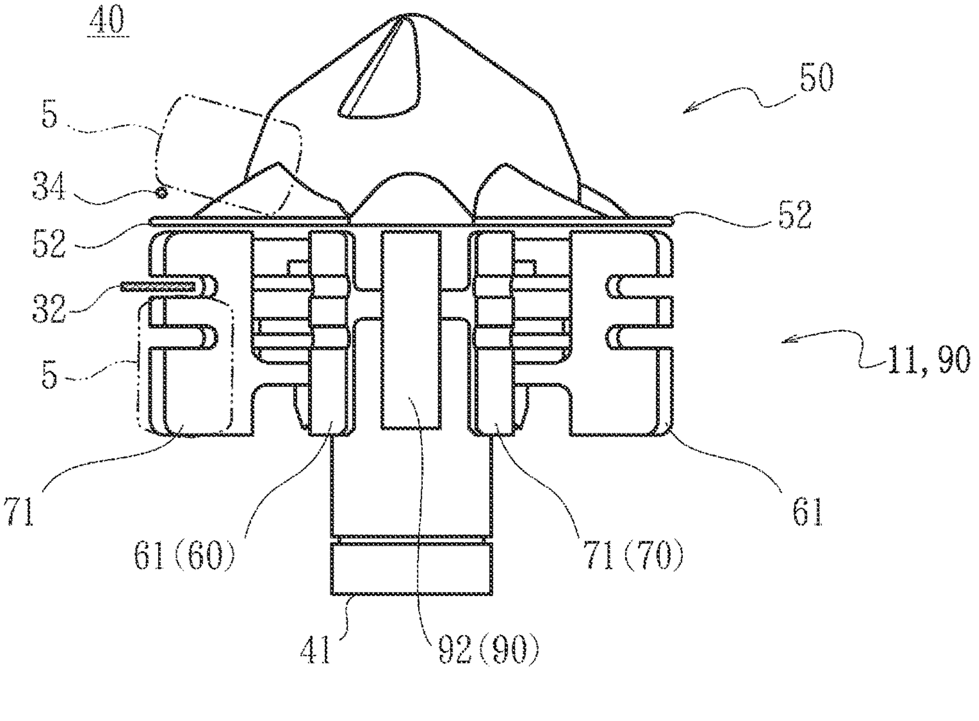
FIG. 10B is a front view of the rotor.

FIGS. 6A, 7A, 8A, 9A, and 10A are each a plan view of the tablet cassette 10 with the upper lid removed, in which the rotor 40 is indicated by the solid line and the tablet container 20 is indicated by the thin dot and dash line. FIGS. 6B to 10B are each a front view of the rotor 40. FIGS. 6A and 6B illustrate a state in which the tablet receiving portions 67 are contracted in both the circumferential direction and the radial direction. FIGS. 7A and 7B illustrate a state in which the tablet receiving portions 67 are slightly expanded in the circumferential direction. FIGS. 8A and 8B illustrate a state in which the tablet receiving portions 67 are significantly expanded in the circumferential direction. FIGS. 9A and 9B illustrate a state in which the tablet receiving portions 67 are slightly expanded in the radial direction. FIGS. 10A and 10B illustrate a state in which the tablet receiving portions 67 are significantly expanded in the radial direction.

Newly developed tablets that are still not used in such a large quantity that requires a dedicated cassette with a single rotatable rotor but that are not used in such a small quantity that can be handled with manual dispensation are often of a relatively large size. In addition, a plurality of such large tablets are seldom taken in one dose, and thus a large number of the tablets are seldom consecutively discharged from a cassette during a short period. Therefore, the tablet cassette according to the present embodiment can achieve a required alignment function and a discharge function, even if there are some fluctuations in the size of the tablet receiving portions of the rotor and the number of the tablet receiving portions is small. Thus, the tablet cassette 10 according to the present embodiment, which includes a small number of tablet receiving portions 67 that can be adjusted to be expanded and contracted, is suitable for automatic discharge of large tablets 5.

In the tablet cassette 10, it is necessary to adapt the size of the tablet receiving portions 67 to the size of the tablets 5 before use. The size of the tablet receiving portions 67 is adjusted through manual work. The adjustment work may be performed on the rotor 40 which is mounted to the tablet container 20, or may be performed on the rotor 40 which is removed from the tablet container 20. In addition, the adjustment work may be performed by causing the tablet receiving portions 67 to follow the tablets 5 with the tablets 5 contained in any of the tablet receiving portions 67, or may be performed by measuring the size of the tablets 5 and varying the tablet receiving portions 67 on the basis of the measured value. In any case, in adjusting the size of the tablet receiving portions 67, the setscrew 43 etc. is slightly loosened before the adjustment, and the setscrew 43 (FIG. 1A) etc. is tightened again after the adjustment.

Specifically (see FIGS. 6 to 10), the circumferential widths of all the four tablet receiving portions 67 are increased and reduced to a width required for consecutive passage of the tablets 5 by slightly loosening the setscrew. 43 etc. to establish a state that enables size adjustment, and thereafter moving the side wall portion 61 and the side wall portion 71, which face each other with the tablet receiving portion 67 interposed therebetween, closer to and away from each other. For the radial expansion-contraction mechanism 90 illustrated in FIGS. 4 and 5, the radial widths of all the four tablet receiving portions 67 are reduced and increased to a width required for consecutive passage of the tablets 5 by advancing and retracting the advancing-retracting members 92 in the radial direction closer to and away from the inner peripheral surface 27 of the container body 21 by rotating the operation rotary member 91 with respect to the rotary shaft 41. When the radial expansion-contraction mechanism. 90 adopts the structure adopted by the tablet cassette described in Japanese Patent No. 3372121, the four advancing-retracting members 92 including the facing wall portions 93 including the sectioning surfaces 93A are manually adjusted in position one by one.

After the sizes of all the tablet receiving portions 67 are adapted to the tablets 5 through easy work, the setscrew 43 etc. is tightened again to finish the adjustment work.

Then, the tablet cassette 10 can be used to contain the desired tablets 5 in a random manner and consecutively discharge the tablets 5. The tablet cassette 10 is replenished with an appropriate amount of the tablets 5, and one of tablet cassettes mounted to a tablet dispensing apparatus etc. that can be dispensed with for the moment is selected and removed from the drive portion, and the tablet cassette 10 according to the present embodiment is attached to the drive portion.

When the tablets 5 are small among those that can be handled by the tablet cassette 10 (see FIG. 6), the side wall portions 61, 71 appear under the non-overhanging portions 53 of the cap member 50 when the facing distance between adjacent side wall portions 61, 71 is reduced so that the side wall portions 61, 71 approach the advancing-retracting member 92. Meanwhile, the advancing-retracting members 92 appear under the non-overhanging portions 53 of the cap member 50 when the facing distance is reduced by moving the advancing-retracting members 92 closer to the inner peripheral surface 27 of the container body 21. The most portion of the upper end portions 94 of the advancing-retracting members 92 that appear under the non-overhanging portions 53 is a smooth curved surface. Thus, the tablets 5 having fallen from the middle portion 51 etc. of the cap member 50 immediately fall down into the tablet receiving portions 67 without staying on the upper end portions 94.

When the width (diameter) of the tablets 5 is slightly large (see FIG. 7), adjacent side wall portions 61, 71 are moved away from each other through adjustment performed correspondingly. Thus, the side wall portions 61, 71 are slightly moved away from the advancing-retracting members 92. The side wall portions 61, 71 are partially hidden under the overhanging portions 52 of the cap member 50. Since the side wall portions 61, 71 are moved in opposite directions by the same amount, the middle positions of the tablet receiving portions 67 in the circumferential direction are maintained at the same positions as the middle positions of the non-overhanging portions 53 of the cap member 50, and the middle positions, in the circumferential direction, of the advancing-retracting members 92 in the tablet receiving portions 67 are also maintained at the same positions as the middle positions of the non-overhanging portions 53. As a result, even if the gap between the side wall portions 61, 71 and the advancing-retracting members 92 is widened, an undesirable event that the tablets 5 fall into the gap is avoided, and the tablets 5 fall into the tablet receiving portions 67.

When the width (diameter) of the tablets 5 is significantly large (see FIG. 8), the side wall portions 61, 71 are significantly moved away from each other through adjustment performed correspondingly. Thus, most or the entirety of the side wall portions 61, 71 is hidden under the overhanging portions 52 of the cap member 50. However, the circumferential widths of the axially opening portions 67B of the tablet receiving portions 67 is regulated to be equal to or less than the upper limit of an appropriate range by the non-overhanging portions 53 of the cap member 50. In addition, the middle positions, in the circumferential direction, of the tablet receiving portions 67 and the middle positions, in the circumferential direction, of the non-overhanging portions 53 are also maintained at the same positions. Thus, the tablets fall down into the tablet receiving portions 67 also in this case.

When the tablets 5 are slightly thick, the advancing-retracting members 92 are retracted toward the rotary shaft 41 and moved away from the inner peripheral surface 27 of the container body 21 according to the thickness. Then, a part of the upper end portions 94 of the advancing-retracting members 92 is hidden under the middle portion 51 of the cap member 50 (see FIG. 9). When the tablets 5 are significantly thick, most of the advancing-retracting members 92 is hidden under the middle portion 51 of the cap member 50 through adjustment performed correspondingly (see FIG. 10). The tablets 5 also fall into only the tablet receiving portions 67, although not described in detail to avoid repetition.

In this tablet cassette 10 (see FIGS. 1 and 6 to 10), the circumferential dimension of the overhanging portions 52 is larger than the circumferential dimension of the non-overhanging portions 53. Therefore, the tablets 5 easily reside on the overhanging portions 52 compared to the tablet cassette with the structure according to the related art. However, since the endless belt 34 is tensely provided above the overhanging portions 52 (see FIG. 10), the tablets 5 which have been carried on the overhanging portions 52 abut against the endless belt 34 to receive a reaction force before the rotary shaft 41 makes one rotation. Thus, the tablets 5 are pushed to stay at the endless belt 34 to change their posture, or pushed up onto the middle portion 51 of the cap member 50. Then, if the tablet receiving portion 67 that comes next is vacant, the tablets 5 fall down into the tablet receiving portion 67 inmost cases. If the tablet receiving portion 67 is not vacant, the tablets stay above the tablet receiving portion 67 because of the partition functioning portion 32, even if the tablets begin to fall down into the tablet receiving portion 67, and fall down to the bottom of the next tablet receiving portion 67 after passing above the discharge port 28.

Therefore, the tablets 5 are adequately consecutively discharged without a significant delay.

[Others]

In the above embodiments, the number of the tablet receiving portions 67 is four. However, the number of the tablet receiving portions 67 is not limited to four, and may be more or less than that.

In the above embodiments, the partition functioning portion 32 is illustrated as a body in a thin plate shape. However, the partition functioning portion 32 is not limited to a thin plate shape, and an elastic endless belt such as the endless belt 34 may be adopted as the partition functioning portion 32, although the partition holding portion 32 may be complicated. When an elastic endless belt is adopted as the partition functioning portion 32, upper and lower tablets are adequately separated even if the size adjustment of the tablet receiving portions 67 is more or less rough. Thus, the size adjustment of the tablet receiving portions 67 is facilitated. In addition, conditions for forming the grooves 63, 73 for avoiding interference between the partition functioning portion 32 and the side wall portions 61, 71 are also alleviated.

As illustrated in FIG. 1B, the rotary shaft 41 etc. may be provided with a small number of (e.g. two) downward facing abutment members K, and a small number of (e.g. two) abutted members (not illustrated) may be provided on the upper surface of the bottom wall portion 25 of the tablet container 20, although not mentioned in the above description in order to avoid complication. With this configuration, the rotor 40 is slightly pushed up intermittently, that is, each time the abutment members climb over the abutted members, along with rotation of the rotor 40, to generate vibration in the vertical direction. Even if the tablets are agglomerated, the agglomerated tablets are immediately separated by the vibration, and the individual tablets easily fall down into the tablet receiving portions 67.

The tablet cassette according to the present embodiment is usable for both a device that incorporates a large number of drive portions fora large number of tablet cassettes, such as a medicine dispensing apparatus, and a device that includes only a single tablet cassette, such as a tablet splitting apparatus. In addition, one tablet cassette can be selectively attached to one of several drive portions to be used, and one of several tablet cassettes can be selectively attached to one drive portion to be used.

A typical example of the tablets to be handled by the tablet cassette according to the present invention is large, vertically long capsules in a round tube shape. However, the tablets that can be handled are not limited thereto, and a large variety of tablets can be handled, such as tablets in other shapes such as a fusiform shape or a disk shape and tablets of other sizes.

Corner portions of the facing wall portions 93 located facing the tablet containing space 22 are preferably rounded. With this configuration, the tablets enter the tablet receiving portions with no difficulty even if the facing wall portions 93 are located on the radially outer side through position adjustment of the facing wall portions 93.

INDUSTRIAL APPLICABILITY

With the present invention, the widths of the plurality of tablet receiving portions can be changed to a desired dimension by manually moving the first turning member or the second turning member while seeing the distance between the pair of side wall portions of the tablet receiving portions from the radially outer side of the rotor.

DESCRIPTION OF REFERENCE NUMERALS

5 tablet
10 tablet cassette
20 tablet container
21 container body
22 tablet containing space
23 grip
24 attachment-detachment portion
25 bottom wall portion
26 through hole
27 inner peripheral surface (rotor insertion space)
28 discharge port
30 partition unit
31 partition holding portion
32 partition functioning portion
33 belt holding portion
34 endless belt
40 rotor
41 rotary shaft
41A straight engagement surface
42 inserted portion
43 setscrew
50 cap member (rotor head portion)
51 middle portion
52 overhanging portion
53 non-overhanging portion
11 circumferential expansion-contraction mechanism
60 first turning member
61 side wall portion
62 sectioning surface
63 groove
64 first turning plate
65 first through hole
66A, 66B pin
67 tablet receiving portion
67A radially opening portion
67B, 67C axially opening portion
70 second turning member
71 side wall portion
72 sectioning surface
73 groove
74 second turning plate
75 second through hole
76A, 76B pin
80 link mechanism
81 base plate
82 through hole
83 straight engagement portion
84 long hole
85A first link
85B second link
86A third link
86B fourth link
87 coupling pin
90 radial expansion-contraction mechanism
91 operation rotary member
91*a* hole
91*b* hole
92 advancing-retracting member
92*a* hole
93 facing wall portion (sectioning surface)
94 upper end portion
94*b* long hole
92A base portion
92Ca, 92Cb protrusion
95 follower rotary member
96 tubular portion
96*a* hole
97 pin
98 guide member
98*a* hole
98*b* guide path
98*c* guide path
99 engagement portion
K downward facing abutment member

The invention claimed is:

1. A tablet cassette comprising:

a tablet container having a tablet containing space therein for containing a plurality of tablets in a random manner, the tablet container including a bottom wall portion formed with a discharge port to allow the plurality of tablets in the tablet containing space to fall down one by one;

a rotary shaft having an axial line extending in a direction orthogonal to the bottom wall portion of the tablet container; and a rotor operable to rotate about the axial line in the tablet containing space of the tablet container along with rotation of the rotary shaft, the rotor including a plurality of tablet receiving portions configured to receive the tablets one by one and allow the tablets to pass therethrough to the discharge port, wherein:

the plurality of tablet receiving portions each include a radially opening portion that opens in a radial direction of the rotary shaft, a pair of axially opening portions that open on both sides in an axial direction in which the axial line extends, a facing wall portion that faces the radially opening portion, and a pair of side wall portions which are a first side wall portion and a second wall portion that face each other in a circumferential direction of the rotary shaft;

the rotor includes a circumferential expansion-contraction mechanism externally mounted on the rotary shaft to expand and contract the plurality of tablet receiving portions in the circumferential direction in conjunction with each other;

the circumferential expansion-contraction mechanism includes:

a first turning member including the first side wall portions of the pairs of side wall portions disposed at predetermined intervals in the circumferential direction, and operable to relatively turn about the axial line within a predetermined angular range, a second turning member including the second side wall portions of the pairs of side wall portions disposed at predetermined intervals in the circumferential direction, and operable to relatively turn about the axial line within the predetermined angular range, and a link mechanism configured to couple the first turning member and the second turning member in an interlocking manner; wherein:

the link mechanism is configured such that when one of the first turning member and the second turning member is turned toward one side in the circumferential direction by a predetermined angle through a manual operation, the other of the first turning member and the second turning member is turned toward the other side in the circumferential direction by an angle equal to the predetermined angle;

the first turning member includes a first turning plate having a first through hole through which the rotary shaft passes and a plurality of the first side wall portions provided at an outer peripheral portion of the first turning plate;

the second turning member includes a second turning plate having a second through hole through which the rotary shaft passes and a plurality of the second side wall portions provided at an outer peripheral portion of the second turning plate;

the plurality of first side wall portions and the plurality of second side wall portions each include one or more grooves formed at a same height in a direction in which the axial line extends, the grooves opening in the circumferential direction and the radial direction of the axial line; and the tablet container is provided with a partition functioning member configured to laterally partition the tablet receiving portion above the discharge port, the partition functioning member passing through the one or more grooves of the plurality of first side wall portions and the plurality of second side wall portions provided at the same height when the rotor is rotated;

wherein a cap member is removably mounted on the rotor and provided with a plurality of overhanging portions extending in the radial direction; and, the tablet cassette further comprises an elastic endless belt tensely provided above the partition functioning member and positioned higher than the overhanging portions.

2. The tablet cassette according to claim 1, wherein the partition functioning member is adjustable in position according to the one or more grooves.

3. The tablet cassette according to claim 1, wherein:

the cap member is shaped to stir tablets in the table containing space; and the plurality of overhanging portions extend in the radial direction except for areas above the plurality of tablet receiving portions.

4. The tablet cassette according to claim 1, wherein the plurality of facing wall portions of the plurality of tablet receiving portions are fixed.

5. The tablet cassette according to claim 1, wherein the plurality of facing wall portions of the plurality of tablet receiving portions are each adjustable in position in the radial direction of the rotary shaft.

6. The tablet cassette according to claim 5, wherein upper end portions of the facing wall portions, which are located facing the tablet containing space, are each rounded.

7. The tablet cassette according to claim 1, wherein the plurality of facing wall portions of the plurality of tablet receiving portions are each adjustable in position in the radial direction of the rotary shaft in conjunction with each other.

8. The tablet cassette according to claim 7, wherein upper end portions of the facing wall portions, which are located facing the tablet containing space, are each rounded.

9. A tablet cassette comprising:

a tablet container having a tablet containing space therein for containing a plurality of tablets in a random manner, the tablet container including a bottom wall portion formed with a discharge port to allow the plurality of tablets in the tablet containing space to fall down one by one;

a rotary shaft having an axial line extending in a direction orthogonal to the bottom wall portion of the tablet container; and a rotor operable to rotate about the axial line in the tablet containing space of the tablet container along with rotation of the rotary shaft, the rotor including a plurality of tablet receiving portions configured to receive the tablets one by one and allow the tablets to pass therethrough to the discharge port, wherein:

the plurality of tablet receiving portions each include a radially opening portion that opens in a radial direction of the rotary shaft, a pair of axially opening portions that open on both sides in an axial direction in which the axial line extends, a facing wall portion that faces the radially opening portion, and a pair of side wall portions which are a first side wall portion and a second wall portion that face each other in a circumferential direction of the rotary shaft;

the rotor includes a circumferential expansion-contraction mechanism externally mounted on the rotary shaft to expand and contract the plurality of tablet receiving portions in the circumferential direction in conjunction with each other;

the circumferential expansion-contraction mechanism includes:

a first turning member including the first side wall portions of the pairs of side wall portions disposed at predetermined intervals in the circumferential direction, and operable to relatively turn about the axial line within a predetermined angular range, a second turning member including the second side wall portions of the pairs of side wall portions disposed at predetermined intervals in the circumferential direction, and operable to relatively turn about the axial line within the predetermined angular range, and a link mechanism configured to couple the first turning member and the second turning member in an interlocking manner; wherein:

the link mechanism is configured such that when one of the first turning member and the second turning member is turned toward one side in the circumferential direction by a predetermined angle through a manual operation, the other of the first turning member and the second turning member is turned toward the other side in the circumferential direction by an angle equal to the predetermined angle;

the first turning member includes a first turning plate having a first through hole through which the rotary shaft passes and a plurality of the first side wall portions provided at an outer peripheral portion of the first turning plate;

the second turning member includes a second turning plate having a second through hole through which the rotary shaft passes and a plurality of the second side wall portions provided at an outer peripheral portion of the second turning plate;

the plurality of first side wall portions and the plurality of second side wall portions each include one or more grooves formed at a same height in a direction in which the axial line extends, the grooves opening in the circumferential direction and the radial direction of the axial line; and the tablet container is provided with a partition functioning member configured to laterally partition the tablet receiving portion above the discharge port, the partition functioning member passing through the one or more grooves of the plurality of first side wall portions and the plurality of second side wall portions provided at the same height when the rotor is rotated;

wherein the partition functioning member is adjustable in position according to the one or more grooves;

wherein a cap member shaped to stir the tablets in the tablet containing space is removably mounted on the rotor;

the cap member is provided with a plurality of overhanging portions extending in the radial direction except for areas above the plurality of tablet receiving portions; and the tablet cassette further comprises an elastic endless belt tensely provided above the partition functioning member and positioned higher than the overhanging portions.

* * * * *